(12) United States Patent
Machida et al.

(10) Patent No.: US 6,973,022 B1
(45) Date of Patent: Dec. 6, 2005

(54) SIGNAL PROCESSOR UNIT AND DIGITAL INFORMATION RECEIVER WITH DETACHABLE CARD MODULE

(75) Inventors: Hiroshi Machida, Saitama-ken (JP); Osamu Yoshida, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/403,183

(22) PCT Filed: Feb. 26, 1999

(86) PCT No.: PCT/JP99/00957

§ 371 (c)(1), (2), (4) Date: Oct. 18, 1999

(87) PCT Pub. No.: WO99/44141

PCT Pub. Date: Sep. 2, 1999

(30) Foreign Application Priority Data

| Feb. 26, 1998 | (JP) | ............................... P10-045521 |
| Apr. 17, 1998 | (JP) | ............................... P10-108065 |
| Jun. 3, 1998 | (JP) | ............................... P10-154897 |
| Jun. 3, 1998 | (JP) | ............................... P10-154908 |

(51) Int. Cl.⁷ ...................... G01R 31/08; G06F 11/00; G08C 15/00; H04J 1/16; H04J 3/14
(52) U.S. Cl. ........................................ 370/216; 714/44
(58) Field of Search ............................... 370/216, 241, 370/242; 714/1–2, 25, 43–44, 55, 100; 340/3.43–3.44; 455/67.14

(56) References Cited

U.S. PATENT DOCUMENTS 4,323,966 A * 4/1982 Whiteside et al. ............. 714/1
5,367,668 A * 11/1994 Pandolfo ...................... 714/12
5,710,767 A * 1/1998 Davidian et al. ........... 370/335
6,594,361 B1 * 7/2003 Chaney et al. .............. 380/221

FOREIGN PATENT DOCUMENTS

| JP | 59191634 | 10/1984 | ............. G06F 3/00 |
| JP | 1276261 | 11/1989 | ........... G06F 13/26 |
| JP | 4132552 | 5/1992 | .......... A61H 23/00 |
| JP | 5216782 | 8/1993 | ........... G06F 13/00 |
| JP | 7210691 | 8/1995 | ............. G06T 9/00 |
| JP | 0863423 | 3/1996 | ........... G06F 13/36 |
| JP | 08149449 | 6/1996 | ........... H04N 7/167 |
| JP | 08191443 | 7/1996 | ............ H04N 7/20 |
| JP | 8265715 | 10/1996 | ............. G06F 7/08 |
| JP | 9147501 | 6/1997 | ........... G11B 20/18 |

* cited by examiner

Primary Examiner—Seema S. Rao
Assistant Examiner—Kevin C. Harper
(74) Attorney, Agent, or Firm—Pillsbury Winthrop Shaw Pittman LLP

(57) ABSTRACT

An attribute reading portion (43) reads attribute information (53, 73, 93, 113) stored in a plurality of second units (5, 7, 9, 11). A connection order deciding portion (45) decides optimum order of a plurality of second units in a daisy-chain connection relative to a first unit (3) based on the read attribute information. A selector controlling portion (47) controls selectors (25, 27, 29, 31, 33) based on the decision. Also, according to another embodiment, when card modules (1002, 1003) are connected to a receiver unit main body, a daisy-chain connection of the card modules can be achieved by switches (1042, 1043, 1044, 1045). Then, a synchronizing signal detector circuit (101) detects a packet synchronizing signal in a digital broadcasting signal which is passed through the card modules. A video/sound decoder circuit (1008) decodes the digital broadcasting signal. In case an error is generated in each circuit (101, 1008), a control circuit (1032) disconnects the defective card module from the daisy-chain connection.

13 Claims, 28 Drawing Sheets

CONNECTION PRIORITY DECISION DATA

SIGNAL PROCESSOR UNIT AND DIGITAL INFORMATION RECEIVER WITH DETACHABLE CARD MODULE

TECHNICAL FIELD

The present invention relates to a digital information receiver unit for receiving and watching the digital broadcasting such as the satellite broadcasting, the cable television (abbreviated as "CATV" hereinafter) broadcasting, etc. and, more particularly, improvement in interfacing between a unit and a receiver unit main body to/from which a card module for carrying out signal processing such as descrambling process of the chargeable broadcasting, etc. can be attached/detached.

BACKGROUND ART

In recent years, a plurality of enterprises for providing the digital satellite broadcasting service have been launched and thus such inconvenience is caused that different receiving units must be established according to individual enterprises. In order to overcome this inconvenience, common use of respective receiver units is being investigated currently while corresponding to scrambling operations in respective broadcasting stations.

For instance, there is a DVB (Digital Video Broadcasting) as European digital broadcasting standard association, and a common interface standard (EN50221) belongs to the DVB as one standard. This common interface standard is an interface standard between a receiver unit main body and a card unit. Particularly, upon viewing the chargeable broadcasting, such interface standard is applied to transmit/receive the signals between the receiver unit main body and the card unit in order to descramble, i.e., decrypt the scrambled, i.e., encrypted broadcasting signal, which has been received by the receiver unit main body, with the use of the card unit.

Then, a configuration and an operation of the digital broadcasting receiver unit adopting the common interface standard will be explained in brief hereunder.

The digital broadcasting receiver unit adopting this common interface standard comprises the receiver unit main body and a sheet of card module or more which can be detachably attached to the receiver unit main body. The receiver unit main body includes a plurality of slots to/from which the card modules can be attached/detached. As the interface standard between the receiver unit main body and the card module, the above common interface standard is utilized.

The digital broadcasting receiver unit receives/demodulates the input broadcasting signal of the satellite broadcasting, the CATV broadcasting, etc., then decodes the demodulated broadcasting signal, and then outputs the decoded signal to the TV set, etc. Accordingly, the user can watch and listen the broadcasting program.

Normally, the digital broadcasting can be classified into the non-chargeable broadcasting and the chargeable broadcasting. Before the broadcasting station transmits the chargeable broadcasting program, such broadcasting station scrambles, i.e., encrypts the broadcasting signals to send out. While, a predetermined card module is provided to the user who has held a contract for watching and listening the chargeable broadcasting programs. When the user who has made the contract for watching and listening the chargeable broadcasting programs tries to watch and listen the chargeable broadcasting programs, such user inserts his or her card module into a slot provided in the receiver unit main body. In this case, the broadcasting signals transmitted from the broadcasting station are received/demodulated by the receiver unit main body, then demodulated signals are input into the connected card module and then descrambled, i.e., encrypted by the card module, and then the descrambled signals are returned to the receiver unit main body once again. As a result, only the user who has had the audience contract can watch and listen the chargeable broadcasting programs.

As the card module, for example, the multiplexed text card which can extract character information dedicatedly from the broadcasting signals in order to watch and listen the multiplexed text broadcasting programs may be employed, in addition to the above descramble card which is able to dedicatedly descramble the broadcasting signals. The multiplexed text card can extract the character information from the broadcasting signals, and then sends back them to the receiver unit main body.

In some times, such card module may be solely connected to the receiver unit main body. Otherwise, plural sheets of card modules may be connected to the receiver unit main body simultaneously. As the case where a plurality of card modules are connected, it may be thought of, for example, to watch and listen the chargeable multiplexed text broadcasting programs. In this case, both the descramble card and the multiplexed text card are connected to the receiver unit main body.

The receiver unit main body has a function for automatically detecting that the card module has been connected. Thus, if the card module is connected, an internally equipped switch changes the connection of the signal path such that the broadcasting signals are transmitted via the card module. If the card module is pulled out, the switch restores the connection of the signal path to the original connection such that the broadcasting signals are transmitted to the succeeding stage like the short circuit. This is because the broadcasting signals can be prevented from escaping from the slot to the outside in the situation that card module is pulled out. If plural sheets of card modules are connected, the receiver unit main body connects these card modules like the daisy-chain connection according to physical positions of the connected slots.

However, if a plurality of card modules are connected to the receiver unit main body, their particular connection order in the daisy-chain connection must be assured in some cases. For example, if the user intends to watch and listen the chargeable multiplexed text broadcasting mentioned above, the descramble card must be connected at the preceding stage of the multiplexed text card in the daisy-chain connection. If the descramble card is connected at the succeeding stage of the multiplexed text card, the broadcasting signals which have not been descrambled are input into the multiplexed text card and therefore the character information cannot be extracted from the signals.

In such case, no problem is caused if the viewer connects the card modules such that the connection order can always be set correctly. However, the request to take always such care is hard for the viewer. Particularly, when the new card module whose connection order must be taken into consideration is connected in the situation that the card module has already been inserted, the card module which has already been inserted must be taken out once from the slot, whereby operations become troublesome. In addition, insertion slots for the card modules may be provided to various positions such as a front surface, a rear surface, a side surface, etc. of the receiver unit main body. For example, in case the front card module and the rear card module must be exchanged, the operation becomes further troublesome.

In addition, such digital broadcasting receiver unit has the problem discussed in the following. That is, when the card module is connected to the receiver unit main body, the above decoder circuit, etc. are connected surely at the succeeding stage of the card module. Accordingly, if any trouble is caused in the card module, especially if the broadcasting signal system cannot be propagated to the succeeding stage, malfunction of the system in the succeeding stage is brought about or the system in the succeeding stage is brought into its inoperable condition. Therefore, not only the function of the defective card module is merely lost, but also the function for receiving the broadcasting via the channel which does not utilize the function of this card module is lost. As a result, there has been the problem such that the overall receiving system is largely affected by the defective card module.

Furthermore, such digital broadcasting receiver unit has the problem discussed in the following. That is, when the card module is connected to the receiver unit main body, the broadcasting signals are supplied via the card module without fail. Accordingly, there has been the problem that, even if the illegal card module is connected for the purpose of unfair practice such as copying operation of the broadcasting signals, etc., the digital broadcasting receiver unit permits such unfair practice. In particular, if such illegal card module is connected to the succeeding stage of the descramble card, the digital broadcasting receiver unit permits easily the copying of the chargeable broadcasting, etc. Moreover, there has been the problem that, the illegal card module is connected to the card module slots arranged in the daisy-chain connection, the overall receiving system is largely affected by the illegal card module.

DISCLOSURE OF INVENTION

In view of the above problems, it is an object of the present invention to provide a digital broadcasting receiver unit which is able to recognize attributes of a card module as a second unit on the side of a receiver unit main body as a first unit when the card module as the second unit is connected to any slot, and then change the connection order to be suited for digital information processing.

Also, it is another object of the present invention to provide a digital broadcasting receiver unit which is able to facilitate operations required, for example, when the card module is connected to the receiver unit main body.

Also, it is another object of the present invention to provide a signal processing system which comprises a first unit having a plurality of slots and a plurality of second units which can be attached/detached to/from the slots respectively, and which is able to optimize the connection order of the second units connected to respective slots in the daisy-chain connection even if the second units are connected to any slots.

Also, it is another object of the present invention to provide a digital broadcasting receiver unit which is able to decide whether or not the card module as the second unit being connected to the receiver unit main body as the first unit can function correctly, and then disconnect functionally the defective second unit from the first unit to thus prevent the large influence upon the overall receiver unit.

Also, it is another object of the present invention to provide a digital broadcasting receiver unit which is able to detect the card module as the second unit which is illegally connected to the receiver unit main body as the first unit, and then disconnect functionally the illegal second unit from the first unit by switching the signals via a switch to bypass the second unit being illegally connected, to thus prevent the unfair practice as well as the large influence upon the overall receiver unit.

In order to achieve the above objects, a signal processing system set forth in claim 1, comprising a first unit for outputting a first signal; and a plurality of second units which are able to be attached/detached to/from the first unit to form a daisy-chain connection via the first unit, for receiving the first signal via the daisy-chain connection, then applying peculiar signal processing to the first signal, and then sending back a processed signal to the first unit; wherein the first unit includes, a plurality of first selecting means each of which receives output signals from second units other than a corresponding second unit and the first signal, and then selectively outputs one of the output signals and the first signal to the corresponding second unit, a second selecting means for receiving output signals from the plurality of second units and the first signal and then selectively outputting one of the output signals from the plurality of second units and the first signal, and connection controlling means for controlling selection of the plurality of first selecting means and the second selecting means in accordance with priority in order in the daisy-chain connection and then changing order of the plurality of second units in the daisy-chain connection.

In order to achieve the above objects, a signal processing system set forth in claim 2, comprising a first unit for receiving/outputting digital information; and a plurality of second units which are able to be attached/detached to/from the first unit to form a daisy-chain connection via the first unit, for receiving the digital information via the daisy-chain connection, then applying peculiar signal processing to the digital information, and then sending back processed digital information to the first unit; wherein the first unit includes, a plurality of first selecting means each of which receives output signals from second units other than a corresponding second unit and the digital information, and then selectively outputs one of the output signals and the digital information to the corresponding second unit, a second selecting means for receiving output signals from the plurality of second units and the digital information and then selectively outputting one of the output signals from the plurality of second units and the digital information, and a connection controlling means for controlling selection of the plurality of first selecting means and the second selecting means in accordance with priority in order in the daisy-chain connection, and then changing order of the plurality of second units in the daisy-chain connection.

According to such digital information receiving system, regardless of physical order in which a plurality of second units are connected to the first unit, a plurality of second units can be connected to the first unit in appropriate order in the daisy-chain connection.

In a signal processing system set forth in claim 3 in the digital information receiving system according to claim 2, the plurality of second units include storing means for storing priorities thereof in order in the daisy-chain connection as attribute information respectively, and the connection controlling means reads the priorities in order in the daisy-chain connection from the storing means in the plurality of second units.

In a signal processing system set forth in claim 4 in the digital information receiving system according to claim 3, the storing means store absolute information of the priorities in order in the daisy-chain connection as attribute information.

In a signal processing system set forth in claim 5 in the digital information receiving system according to claim 3, the storing means store relative information of the priorities in order in the daisy-chain connection as attribute information.

In a signal processing system set forth in claim 6 in the digital information receiving system according to claim 2, the connection controlling means acquires information of the priorities in order in the daisy-chain connection from an external device via a communication medium.

In a signal processing system set forth in claim 7 in the digital information receiving system according to claim 2, the connection controlling means acquires information of the priorities of the plurality of second units, which are able to be connected to the first unit, in order in the daisy-chain connection from an external device via a communication medium, and finds the plurality of second units which are actually connected to the first unit.

In a signal processing system set forth in claim 8 in the digital information receiving system according to claim 2, the connection controlling means changes order in the daisy-chain connection in accordance with the priorities of the plurality of second units, which are connected to the first unit, in order in the daisy-chain connection every time when a new second unit is attached/detached to/from the first unit.

According to such digital information receiving system, even in the case that new second units are connected to any empty slots of the first unit to which some second units have already been connected, otherwise even in the case that any second units are pulled out from the slots of the first unit to which some second units have already been connected, the daisy-chain connection can be accomplished in appropriate order.

In order to achieve the above objects, a signal processing system set forth in claim 9 which includes a first unit for receiving/outputting digital information, and a plurality of second units which are able to attached/detached to/from the first unit to form a daisy-chain connection via the first unit, for receiving the digital information via the daisy-chain connection, then applying peculiar processing to the digital information, and then sending back processed digital information to the first unit, the system comprising: a plurality of switching means each provided to a corresponding second unit, for switching so as to incorporate the corresponding second unit into the daisy-chain connection or disconnect the corresponding second unit from the daisy-chain connection; an abnormality detecting/deciding means for detecting/deciding abnormality of the plurality of second units; and a controlling means for controlling a switching means corresponding to a second unit which is detected/decided to be abnormal so as to disconnect the second unit from the daisy-chain connection, based on a signal from the abnormality detecting/deciding means.

According to such digital information receiving system, when a connected second unit becomes defective, or when an illegal second unit is connected, such defective second unit or such illegal second unit can be disconnected quickly from the daisy-chain connection and also the process can be still continued by remaining second units.

In a signal processing system set forth in claim 10 in the digital information receiving system according to claim 9, the abnormality detecting/deciding means is a synchronizing signal detecting means for receiving the digital information which are passed through the plurality of second units via the daisy-chain connection and then detecting a packet synchronizing signal.

In a signal processing system set forth in claim 11 in the digital information receiving system according to claim 9, the abnormality detecting/deciding means is a digital information decoding means for receiving the digital information which are passed through the plurality of second units via the daisy-chain connection, then decoding the digital information, and then detecting a decode error.

In a signal processing system set forth in claim 12 in the digital information receiving system according to claim 9, the abnormality detecting/deciding means includes a test signal multiplexing means for multiplexing the digital information with the test signal before the digital information are passed through the plurality of second units, and a test signal detecting means for detecting the test signal from the digital information which are passed through the plurality of second units via the daisy-chain connection to decide whether or not the detected test signal is normal.

In a signal processing system set forth in claim 13 in the digital information receiving system according to claim 9, the abnormality detecting/deciding means includes a test signal multiplexing means for multiplexing the digital information with the test signal before the digital information are passed through the plurality of second units, a plurality of test signal processing means provided to the plurality of second units respectively, for applying predetermined process to the test signal with which input digital information is multiplexed, and then outputting the processed test signal, a test signal detecting means for detecting the test signal from the digital information which are passed through the plurality of second units via the daisy-chain connection, and a deciding means for applying process corresponding to the predetermined process to the test signal detected by the test signal detecting means to decide whether or not the test signal is normal.

In a signal processing system set forth in claim 14 in the digital information receiving system according to claim 9, the abnormality detecting/deciding means includes a test signal multiplexing means for multiplexing the digital information with the test signal before the digital information are passed through the plurality of second units, a plurality of test signal encoding means provided to the plurality of second units respectively, for encoding the test signal with which input digital information is multiplexed, and then outputting the encoded test signal, a test signal detecting means for detecting the test signal from the digital information which are passed through the plurality of second units via the daisy-chain connection, and a test signal decoding means for decoding the test signal detected by the test signal detecting means and then deciding whether or not the decoded test signal is normal.

In a signal processing system set forth in claim 15 in the digital information receiving system according to claim 9, the abnormality detecting/deciding means includes a test signal encoding means for encoding the test signal, a test signal multiplexing means for multiplexing the digital information with the encoded test signal before the digital information are passed through the plurality of second units, a plurality of test signal decoding means provided to the plurality of second units respectively, for decoding the test signal with which input digital information is multiplexed, and then outputting the decoded test signal, and a test signal detecting means for detecting the test signal from the digital information which are passed through the plurality of second units via the daisy-chain connection to decide whether or not the detected test signal is normal.

In a signal processing system set forth in claim 16 in the digital information receiving system according to claim 9, the controlling means controls the plurality of switching means so as to connect the plurality of second units to the first unit one by one, and the abnormality detecting/deciding means detects/decides the abnormality of the plurality of second units one by one.

In a signal processing system set forth in claim 17 in the digital information receiving system according to claim 16, the abnormality detecting/deciding means is a synchronizing signal detecting means for receiving the digital information which are passed through the plurality of second units via the daisy-chain connection and then detecting a packet synchronizing signal.

In a signal processing system set forth in claim 18 in the digital information receiving system according to claim 16, the abnormality detecting/deciding means is a digital information decoding means for receiving the digital information which are passed through the plurality of second units via the daisy-chain connection, then decoding the digital information, and then detecting decode error.

In a signal processing system set forth in claim 19 in the digital information receiving system according to claim 16, the abnormality detecting/deciding means includes a test signal multiplexing means for multiplexing the digital information with the test signal before the digital information are passed through the plurality of second units, and a test signal detecting means for detecting the test signal from the digital information which are passed through the plurality of second units via the daisy-chain connection to decide whether or not the detected test signal is normal.

In a signal processing system set forth in claim 20 in the digital information receiving system according to claim 16, the abnormality detecting/deciding means includes a test signal multiplexing means for multiplexing the digital information with the test signal before the digital information are passed through the plurality of second units, a plurality of test signal processing means provided to the plurality of second units respectively, for applying predetermined process to the test signal with which input digital information is multiplexed, and then outputting the processed test signal, a test signal detecting means for detecting the test signal from the digital information which are passed through the plurality of second units via the daisy-chain connection, and a deciding means for applying process corresponding to the predetermined process to the test signal detected by the test signal detecting means to decide whether or not the test signal is normal.

In a signal processing system set forth in claim 21 in the digital information receiving system according to claim 16, the abnormality detecting/deciding means includes a test signal multiplexing means for multiplexing the digital information with the test signal before the digital information are passed through the plurality of second units, a plurality of test signal encoding means provided to the plurality of second units respectively, for encoding the test signal with which input digital information is multiplexed, and then outputting the encoded test signal, a test signal detecting means for detecting the test signal from the digital information which are passed through the plurality of second units via the daisy-chain connection, and a test signal decoding means for decoding the test signal detected by the test signal detecting means and then deciding whether or not the decoded test signal is normal.

In a signal processing system set forth in claim 22 in the digital information receiving system according to claim 16, the abnormality detecting/deciding means includes a test signal encoding means for encoding the test signal, a test signal multiplexing means for multiplexing the digital information with the encoded test signal before the digital information are passed through the plurality of second units, a plurality of test signal decoding means provided to the plurality of second units respectively, for decoding the test signal with which input digital information is multiplexed, and then outputting the decoded test signal, and a test signal detecting means for detecting the test signal from the digital information which are passed through the plurality of second units via the daisy-chain connection to decide whether or not the detected test signal is normal.

In a signal processing system set forth in claim 23 in the digital information receiving system according to claim 9, the abnormality detecting/deciding means includes a plurality of corresponding abnormality detecting/deciding means, provided to correspond to the plurality of second units respectively, for detecting/deciding the abnormality of the plurality of second units respectively.

In a signal processing system set forth in claim 24 in the digital information receiving system according to claim 23, each of the plurality of corresponding abnormality detecting/deciding means is a synchronizing signal detecting means for receiving the digital information being output from the corresponding second unit and then detecting a packet synchronizing signal.

In a signal processing system set forth in claim 25 in the digital information receiving system according to claim 23, each of the plurality of corresponding abnormality detecting/deciding means includes a test signal multiplexing means for multiplexing the digital information to be received by the corresponding second unit with the test signal, and a test signal detecting means for detecting the test signal from the digital information being output from the corresponding second unit to decide whether or not the detected test signal is normal.

In a signal processing system set forth in claim 26 in the digital information receiving system according to claim 23, each of the plurality of corresponding abnormality detecting/deciding means includes a test signal multiplexing means for multiplexing the digital information to be received by the corresponding second unit with the test signal, a test signal processing means provided to the corresponding second unit, for applying predetermined process to the test signal with which input digital information is multiplexed, and then outputting the processed test signal, a test signal detecting means for detecting the test signal from the digital information being output from the corresponding second unit, and a deciding means for applying process corresponding to the predetermined process to the test signal detected by the test signal detecting means to decide whether or not the test signal is normal.

In a signal processing system set forth in claim 27 in the digital information receiving system according to claim 23, each of the plurality of corresponding abnormality detecting/deciding means includes a test signal multiplexing means for multiplexing the digital information to be received by the corresponding second unit with the test signal, a test signal encoding means provided to the corresponding second unit, for encoding the test signal with which input digital information is multiplexed, and then outputting the encoded test signal, a test signal detecting means for detecting the test signal from the digital information being output from the corresponding second unit, and a test signal decoding means for decoding the test signal detected by the test signal detecting means and then deciding whether or not the decoded test signal is normal.

In a signal processing system set forth in claim 28 in the digital information receiving system according to claim 23, each of the plurality of corresponding abnormality detecting/deciding means includes a test signal encoding means for encoding the test signal, a test signal multiplexing means for multiplexing the digital information to be received by the corresponding second unit with the encoded test signal, a test signal decoding means provided to the corresponding second unit, for decoding the test signal with which input digital information is multiplexed, and then outputting the decoded test signal, and a test signal detecting means for detecting the test signal from the digital information being output from the corresponding second unit to decide whether or not the detected test signal is normal.

In a signal processing system set forth in claim 29 in the digital information receiving system according to claim 9, the controlling means resets second units succeeding to a second unit whose abnormality is detected/decided when the abnormality detecting/deciding means detects/decides the abnormality.

A signal processing system set forth in claim 30 in the digital information receiving system according to claim 9 further comprises a displaying means for displaying contents of an abnormality when the abnormality detecting/deciding means detects/decides the abnormality.

In a signal processing system set forth in claim 31 in the digital information receiving system according to claim 12, the test signal multiplexing means multiplexes an invalid portion in each packet of the digital information with the test signal.

In a signal processing system set forth in claim 32 in the digital information receiving system according to claim 9, the digital information is a digital broadcasting signal.

BEST MODE FOR CARRYING OUT THE INVENTION

Embodiments of the present invention will be explained in detail with reference to the accompanying drawings hereinafter.

Figure 1:
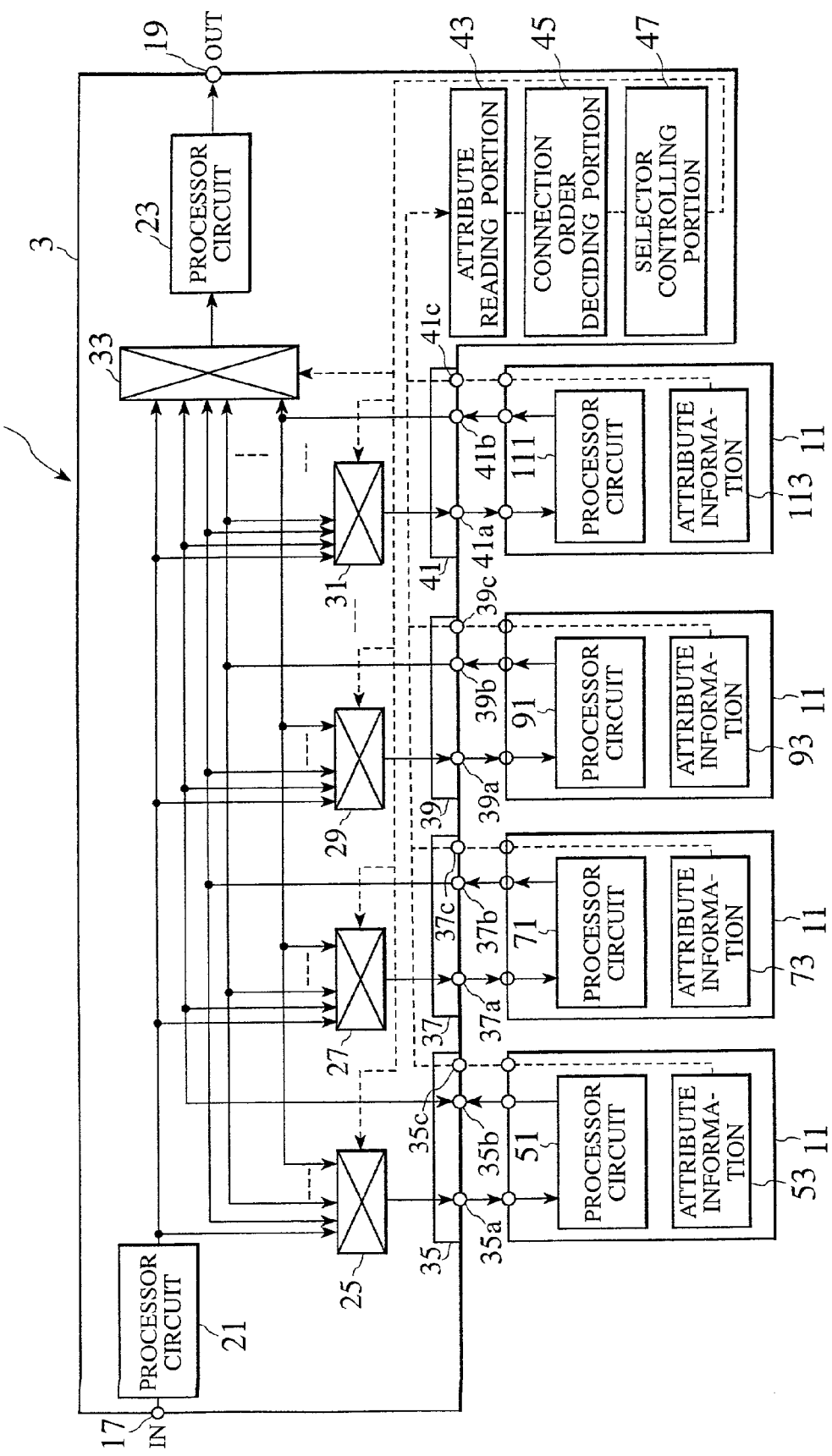
FIG. 1 is a block circuit diagram showing a configuration of an embodiment of a signal processing system according to the present invention.

FIG. 1 is a block circuit diagram showing an embodiment of a signal processing system according to the present invention. In FIG. 1, a signal processing system 1 comprises a first unit 3 having a plurality of ports (the number of the ports is assumed as N hereinafter), and a plurality of second units 5, 7, 9, . . . , 11 which can be detachably attached to the first unit 3 (the number of the second units is set less than N). That is, the second units may be connected to all ports of the first unit, or the empty ports may be left. All the second units do not have the same function. If the second units can satisfy predetermined interface conditions, various second units having different functions may be connected.

The first unit 3 comprises an input terminal 17 for receiving the signal as the process object from the external device; processor circuits 21, 23 for processing the signal; an output terminal 19 for outputting the processed signal; selectors 25, 27, 29, . . . , 31 as first selecting means; a selector 33 as a second selecting means; a plurality of ports 35, 37, 39, . . . , 41; an attribute reading portion 43 for reading attribute information indicating the attribute from the second units which are connected to respective ports; a connection order deciding portion 45 for deciding the connection priority based on read attribute information; and a selector controlling portion 47 for controlling the selectors 25, 27, 29, . . . , 31, 33 based on the decision of the connection priority.

The processor circuits 21 and 23 are not indispensable constituent elements of the present invention, and thus may be omitted to bypass them.

For simplicity of explanation, the ports 35, 37, 39, . . . , 41 of the first unit 3 are shown to include output signal terminals 35a, 37a, 39a, . . . , 41a, input signal terminals 35b, 37b, 39b, . . . , 41b, and control signal terminals 35c, 37c, 39c, . . . , 41c respectively. However, input and output signals may be multiplexed by using a two-way device such as a line driver/receiver, etc., otherwise a part of the control signals and the input and output signals may be multiplexed.

Each of the N selectors 25, 27, 29, . . . , 31 provided to correspond to respective ports is formed of an N-way selector. Such N-way selector receives [N−1] input signals from the ports other than the port opposing to the selector and an output signal of the processor circuit 21 in the first unit 3, and then selects one of the received signals according to the control signal from the selector controlling portion 47 to output it to the corresponding port.

The selector 33 is formed of an [N+1]-way selector. Such [N+1]-way selector receives the output signals of the processor circuit 21 in the first unit 3 and the N input signals input from respective ports (the output signals of the second units connected to the ports), and then selects one of the received signals according to the control signal from the selector controlling portion 47 to output it to the processor circuit 23.

The second units 5, 7, 9, . . . , 11 comprise the processor circuits 51, 71, 91, . . . , 111 and the attribution information memories 53, 73, 93, . . . , 113 respectively.

As the processor circuits 51, 71, 91, . . . , 111, regardless of the type of an analogue signal processor circuit and a digital signal processor circuit, any signal processor circuit may be provided in compliance with the object of the signal processing system 1.

As the attribution information memories 53, 73, 93, . . . , 113, various ROMs or the nonvolatile RAMs may be employed, otherwise any type memory may be adopted in accordance with the attribute information to be identified, if the attribute reading portion 43 can read or detect the information regardless of the memory specification such as a clamp level at the control signal terminal.

Next, an operation of the signal processing system in FIG. 1 will be explained hereunder.

First, the attribute reading portion 43 in the first unit 3 decides whether or not the second units are connected to the ports 35, 37, 39, . . . , 41 respectively. Then, if it is decided that the second units have been connected, the attribute reading portion 43 sends a read signal sequentially to the ports, to which the second units are connected, in order to read out the attribute information, and then read out respective attribute information from the second units.

Alternatively, a dedicated detector circuit for deciding whether or not the second units are connected to the ports 35, 37, 39, . . . , 41 respectively may be provided such that a detection signal can be sent from the detector circuit to the attribute reading portion 43, and then the attribute reading portion 43 may send read signals sequentially to the ports, to which the second units are connected, in response to the detection signal.

In turn, the connection order deciding portion 45 decides the connection priority of the second units 5, 7, 9, . . . , 11, which are connected to the ports respectively, based on the attribute information being read from respective ports. Then, the selector controlling portion 47 controls the selection of the selectors 25, 27, 29, . . . , 31 and 33 based on the decision.

Then, this selection logic will be explained hereunder. First, the selector controlling portion 47 controls the selectors such that the selector for outputting the signal to the port (referred to as a "port A" hereinafter), to which the second unit with the highest priority which must be connected to the head of the daisy-chain connection is connected, can select the output of the processor circuit 21.

Then, the selector controlling portion 47 controls the selectors such that the selector for outputting the signal to the port (referred to as a "port B" hereinafter), to which the second unit with the second highest priority is connected, can select the input signal from the port A.

The selector controlling portion 47 controls the selectors successively, and finally controls the selectors such that the selector 33 can select the input signal from the port (referred to as a "port Z" hereinafter), to which the second unit with the lowest priority is connected, to output it to the processor circuit 23. Likewise, the daisy-chain can be established in accordance with the priority.

After this, the signal being input into the input terminal 17 is first processed by the processor circuit 21, then processed sequentially by a plurality of second units (of course, the signal is processed even when only one single second unit is connected) in the daisy-chain connection, then finally processed by the processor circuit 23, and then the processing result is output from the output terminal 19.

In addition, the signal processing system 1 allows the change in connection of respective ports during operation, and is able to perform the dynamic change in connection order.

As described above, according to the signal processing system of the present embodiment, when various second units are connected to a plurality of ports of the first unit to constitute the daisy-chain connection of the second units, such complicated operations can be neglected that the user must take previously account of the priority employed to connect the second units in accordance to individual attributes of the second units and then connect the second units to the ports respectively according to the priority, and also the second units can be connected to the first unit according to the optimal connection priority because the first unit can check automatically the attributes of the second units respectively.

Figure 2:
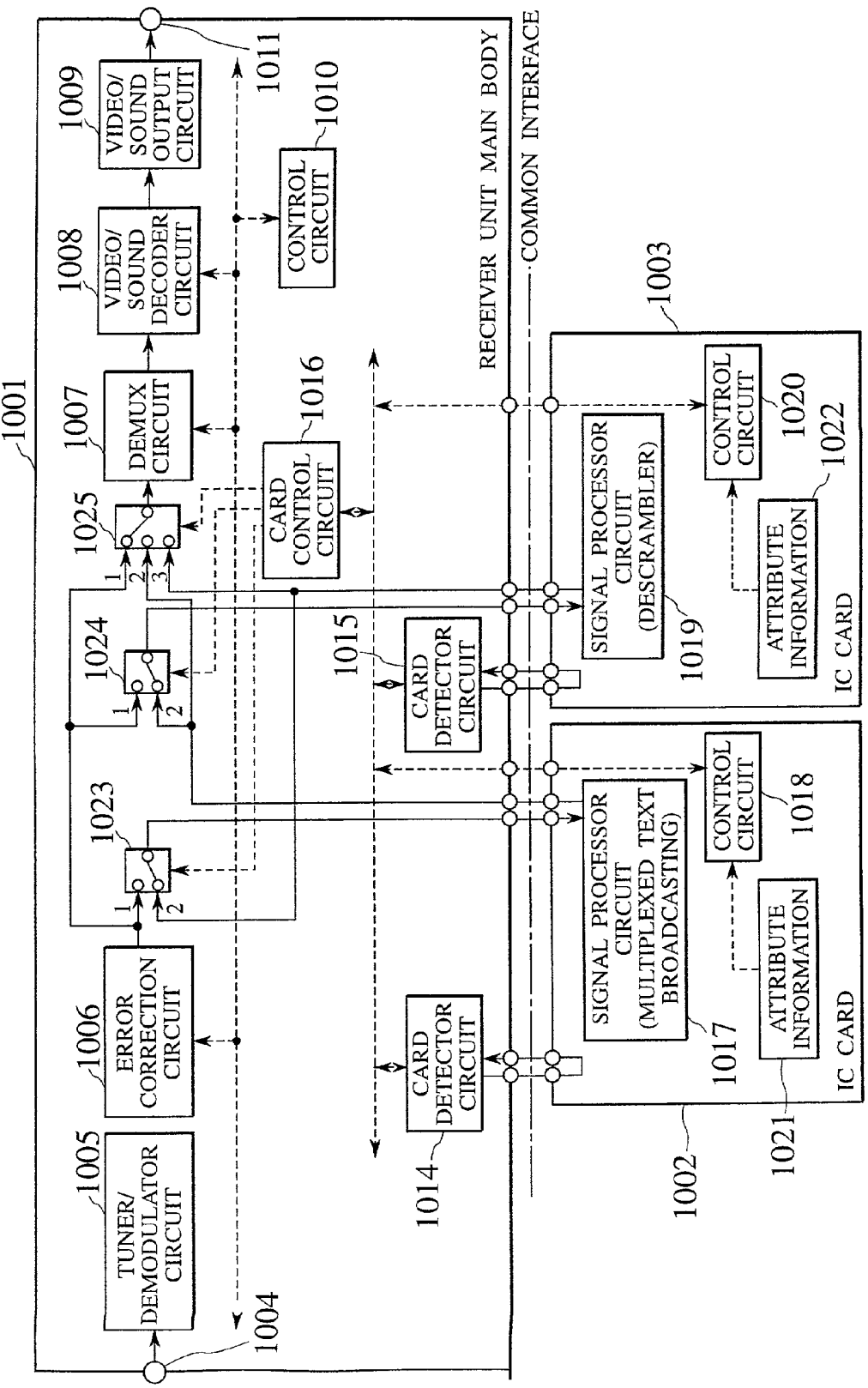
FIG. 2 is a block circuit diagram showing a configuration of a digital broadcasting receiver unit according to a first embodiment of the present invention.

FIG. 2 is a block circuit diagram showing a digital broadcasting receiver unit according to a first embodiment of the present invention. In an example of FIG. 2, the case where two sheets of card modules are employed is shown.

However, the digital broadcasting receiver unit is not limited to this example. Similarly, the digital broadcasting receiver unit may be extended to the case where three sheets or more of card modules are inserted.

The digital broadcasting receiver unit comprises a receiver unit main body 1001 and two sheets of card modules 1002, 1003. As an interface standard between the receiver unit main body 1001 and the card modules 1002, 1003, a common interface standard is employed.

The receiver unit main body 1001 includes an input terminal 1004 for receiving the broadcasting signals such as the satellite broadcasting, the CATV broadcasting, etc.; a tuner/demodulator circuit 1005 for receiving the broadcast over a desired channel; an error correction circuit 1006 for correcting the transmission error; switches 1023, 1024, 1025 for switching an internal signal of the receiver unit main body 1001 and output signals of the card modules 1002, 1003; a DEMUX circuit 1007 for extracting a video packet and a sound packet over the desired channel from a plurality of program transport packets (TS) which are time-division multiplexed; a video/sound decoder circuit 1008 for decoding the digitally compressed video and sound signals respectively; a video/sound output circuit 1009 for digital/analogue-converting the video and sound signals respectively and then amplifying them up to a predetermined level; card detector circuits 1014, 1015 for detecting respectively whether or not the card module is inserted into the corresponding slot; a card control circuit 1016 for executing the control for the card modules 1002, 1003; and a control circuit 1010 for controlling the overall receiving unit.

The card modules 1002, 1003 includes a signal processor circuit 1017 as a multiplexed text broadcasting processor circuit, a signal processor circuit 1019 as a descrambler; attribute information memory portions 1021, 1022; and control circuits 1018, 1020 respectively.

In the receiver unit main body, the digital broadcasting signals which are subjected to frequency multiplexing and/or time-division multiplexing are input into the terminal 1004. The tuner/demodulator circuit 1005 selects the signal having a desired frequency from the broadcasting signals input from the terminal 1004 and then demodulates the signal. The error correction circuit 1006 corrects errors of the broadcasting signals caused during transmission by using the error correcting code attached to the signal. Normally, an output signal stream of the error correction circuit 1006 has a format of MPEG-SYSTEM (ISO/IEC13818-1), in which a plurality of time-division multiplexed program signals are contained.

This signal stream is input into the switches 1023, 1024, 1025. Also, an output of the card module 1003 is input into the switch 1023, and an output of the card module 1002 is input into the switch 1024. Both outputs of the card modules 1002, 1003 are input into the switch 1025.

Then, an output of the switch 1023 is input into the card module 1002, and an output of the switch 1024 is input into the card module 1003. An output of the switch 1025 is input into the DEMUX circuit 1007.

Respective switches are controlled by the card control circuit 1016 so as to provide appropriate connections according to the insertion/detachment of the card modules. An operation will be explained in brief hereinbelow.

First, if no card module is inserted, the switch 1025 is controlled to select the position 1, then the output of the error correction circuit 1006 is directly connected to the DEMUX circuit 1007, and then the signals are processed by the video/sound decoder circuit 1008 and the video/sound output circuit 1009 without passing the card module and then output from the terminal 1011 to a TV. The DEMUX circuit 1007 selects the necessary signals from the time-division multiplexed broadcasting signals. The video/sound decoder circuit 1008 decodes the video/sound signals which are compressed and encoded in digital fashion. The video/sound output circuit 1009 carries out D/A conversion, format conversion, etc.

Then, assume that the card module 1002, for example, is inserted. Then, a card detecting signal which informs the card control circuit 1016 of insertion of the card is generated by the card detector circuit 1014. The card control circuit 1016 communicates with the control circuit 1018 in the card module 1002 to get information of the inserted card, and then reads the attribute information from the attribute information memory portion 1021.

The card control circuit 1016 recognizes that the card module is the multiplexed text broadcasting card based on this information, and turns the switch 1023 to the position 1 and the switch 1025 to the position 2 to transmit/receive the stream signals such that the signals can be input into the DEMUX circuit 1007 via the card module 1002. This multiplexed text broadcasting card extracts information from the necessary portion in the stream, e.g., sends data an external PC, etc. over the communication path such as RS232C, and feeds back the unnecessary portion in the stream to the receiver unit main body 1001 without any processing.

Then, if the card module 1003 is inserted under this condition, the card control circuit 1016 similarly communicated with the control circuit 1020 in the card module 1003 in response to the card detecting signal issued from the card detector circuit 1015, and then executes an operation to read the attribute information from the attribute information memory portion 1022.

The card control circuit 1016 detects that the card module 1003 is the descramble card, and then compares the priority of the card module 1002 with the priority of the card module 1003 in the daisy-chain connection. In this case, since the data cannot be extracted by the multiplexed text broadcasting card unless the descramble card is connected on the upstream side, the card control circuit 1016 turns the switch 1023 to the position 2 and the switch 1024 to the position 1 respectively. Since the switch 1025 has been switched to the position 2, the card control circuit 1016 controls the switch 1025 to remain as it is.

That is, the card module 1003 is connected at the preceding stage of the card module 1002. Thus, the output of the error correction circuit 1006 is first input into the card module 1003, then is subjected to the descramble process, i.e., decryption process in the card module 1003, and then input into the DEMUX circuit 1007 via the card module 1002.

In the signal processing of the stream signal in the card modules, each card module applies the signal processing only to the necessary portion of the stream signal, but does not apply the signal processing to the unnecessary portion. For example, the descramble card selects only a particular program from the stream signal on which a plurality of programs are multiplexed, and then descrambles the particular program and outputs other programs to the receiver unit as they are.

In this way, because the descramble card (the card module 1003 in this case) is placed at the preceding stage of the multiplexed text broadcasting card (the card module 1002 in this case), the disadvantage which is caused when the signals are processed by the multiplexed text broadcasting card prior to the descramble can be prevented.

An example of the digital broadcasting receiver unit having two slots has been described. In the digital broadcasting receiver unit having three slots or more, similarly the daisy-chain connection can also be switched by deciding the dependency in the daisy-chain connection. In this case, if the number of the slots and the number of the inserted cards are increased, the advantage can be increased correspondingly.

Next, the attribute information and the card priority decision in the card control circuit 1016 will be explained still further.

For example, the "common interface" standard in the above DVB standard is the extended PCMCIA (Personal Computer Memory Card International Association) standard. The cards, if prepared in conformity with the PCMCIA standard, can be connected to the common interface.

The PCMCIA standard card is designed to include card attribute information such as CIS (Card Instruction Structure) in the card. The CIS can describe detailed information such as type of the card (I/O card, memory card, descramble card, or the like), manufacturer, version, etc. The connection priority to other cards can be described by using a part of the CIS.

FIGS. 3 to 7 show examples of CIS. Setting of the priority by using the CIS will be explained hereunder.

Figure 3:
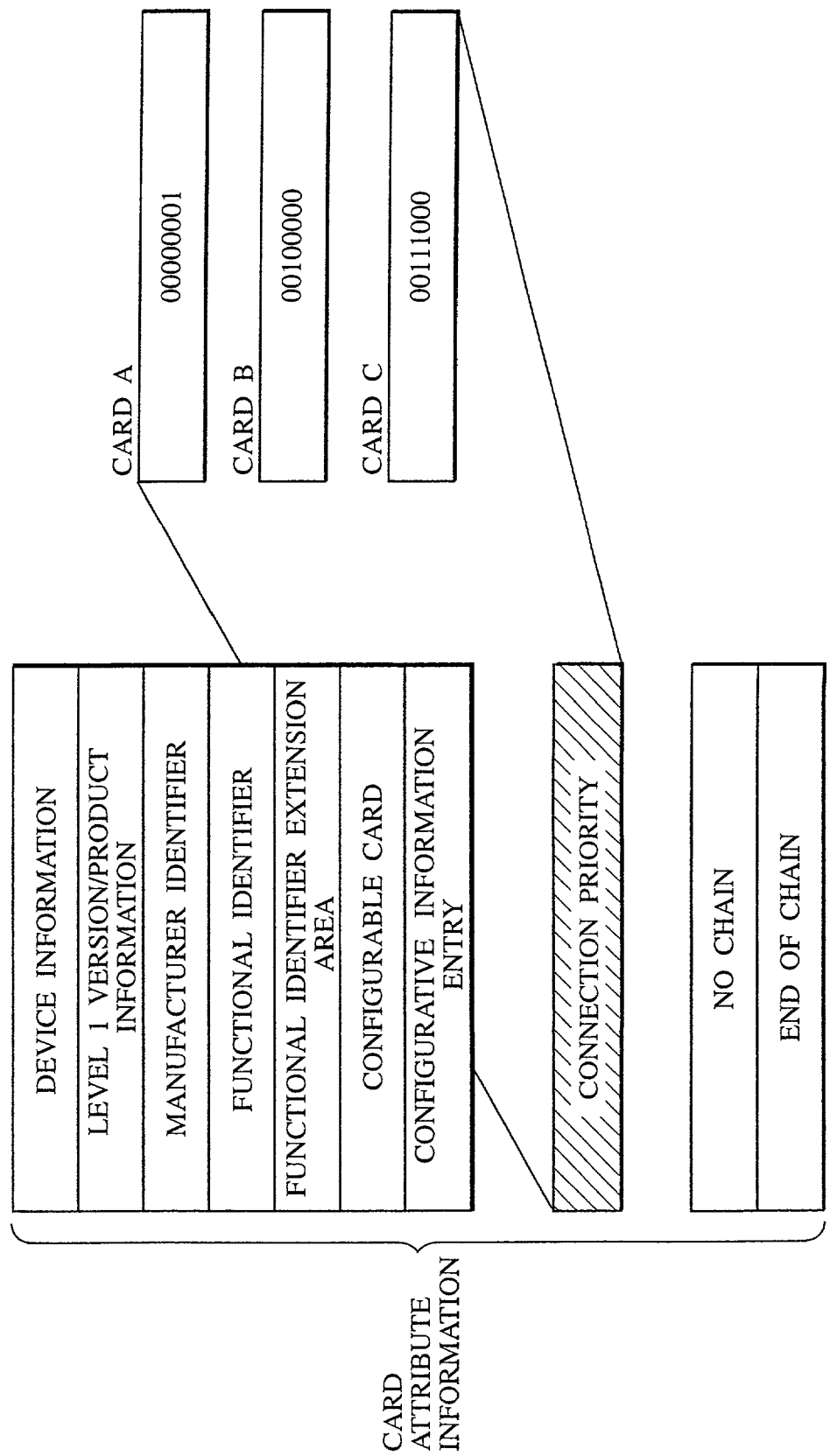
FIG. 3 is a first example of connection priority information utilizing card attribute information (CIS) of PCMCIA.

In FIG. 3, a connection priority which is an absolute priority to decide the connection priority among the cards is attached to the CIS, in addition to normal information such as configuration data, e.g., device information, manufacturer, etc. Assume that three cards, for example, cards A, B, C are prepared, lower numbers are assigned to respective cards A, B, C in the order of higher priority. Its own priority of the card is described as the connection priority information in the CIS information.

Figure 4:
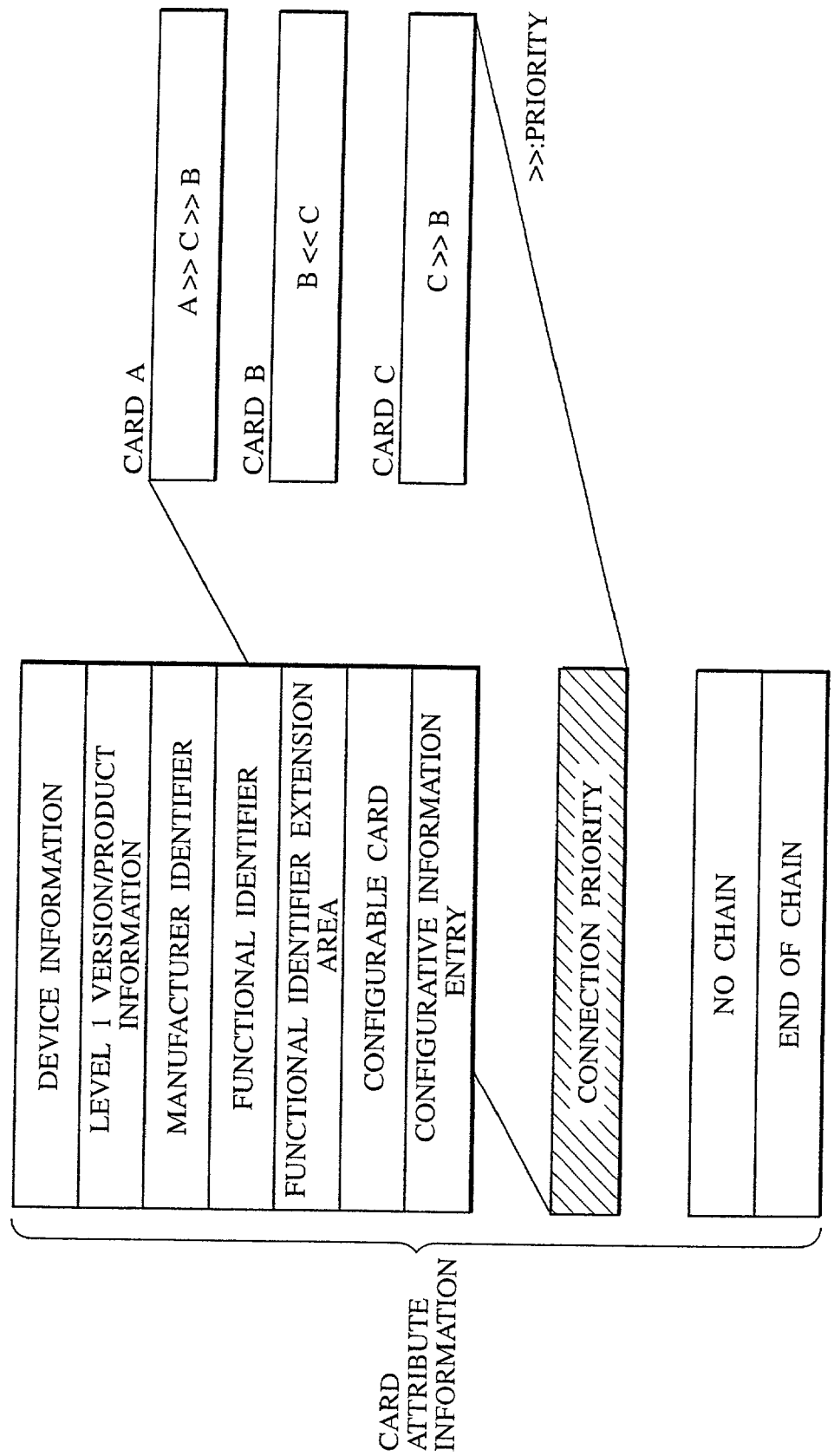
FIG. 4 is a second example of connection priority information utilizing the card attribute information (CIS) of PCMCIA.

Also, as shown in FIG. 4, a relative priority of own card relative to other cards may be described as the connection priority information. For example, information indicating that the card B must be set prior to the card C (B<<C) may be described in the card B.

Figure 5:
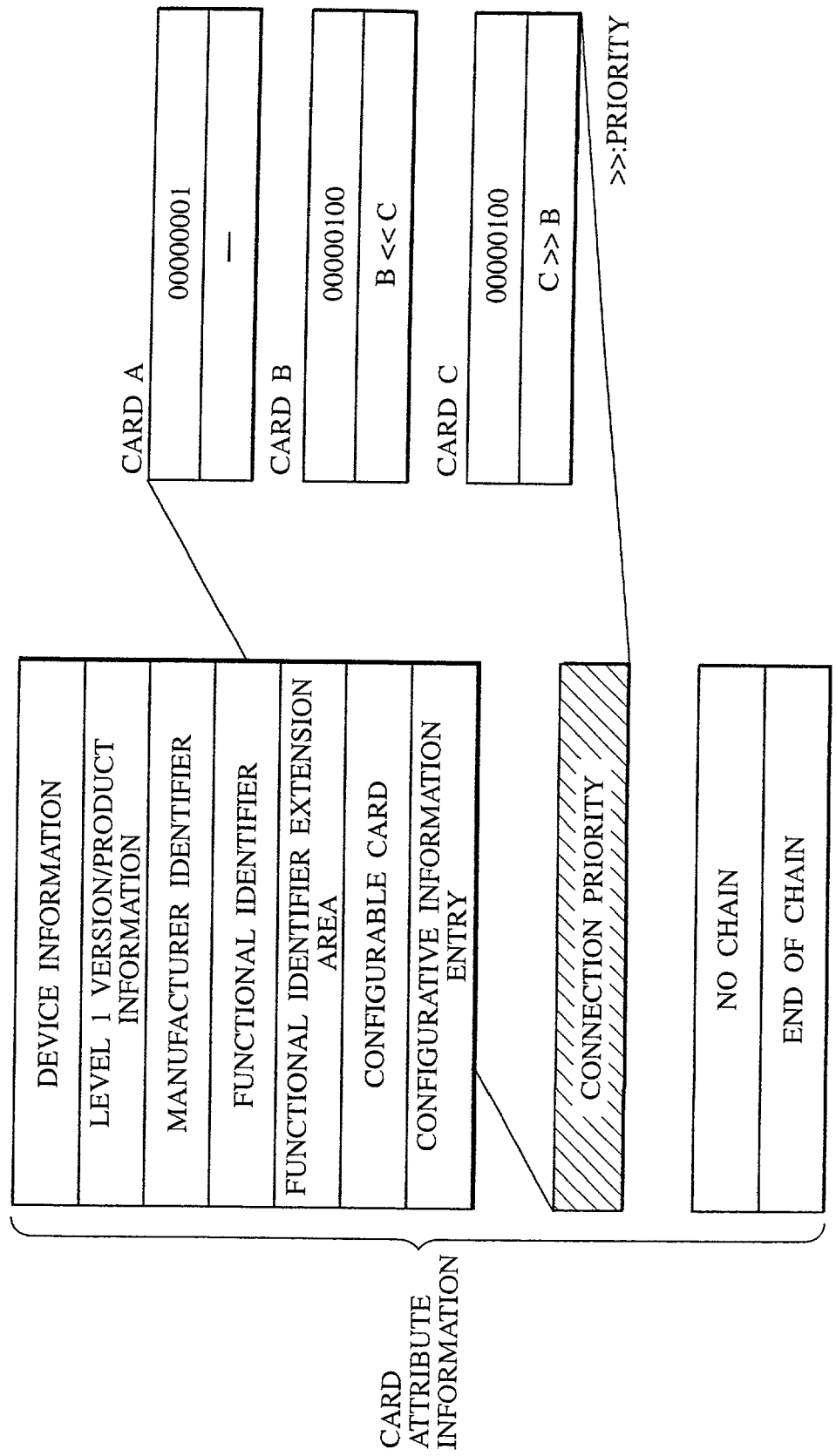
FIG. 5 is a third example of connection priority information utilizing the card attribute information (CIS) of PCMCIA.

Further, as shown in FIG. 5, the connection priority information may be constituted by using both the absolute priority and the relative priority in combination.

In this way, the information indicating the priority among the cards may be described by employing either one of the absolute priority and the relative priority or both of them.

Figure 8:
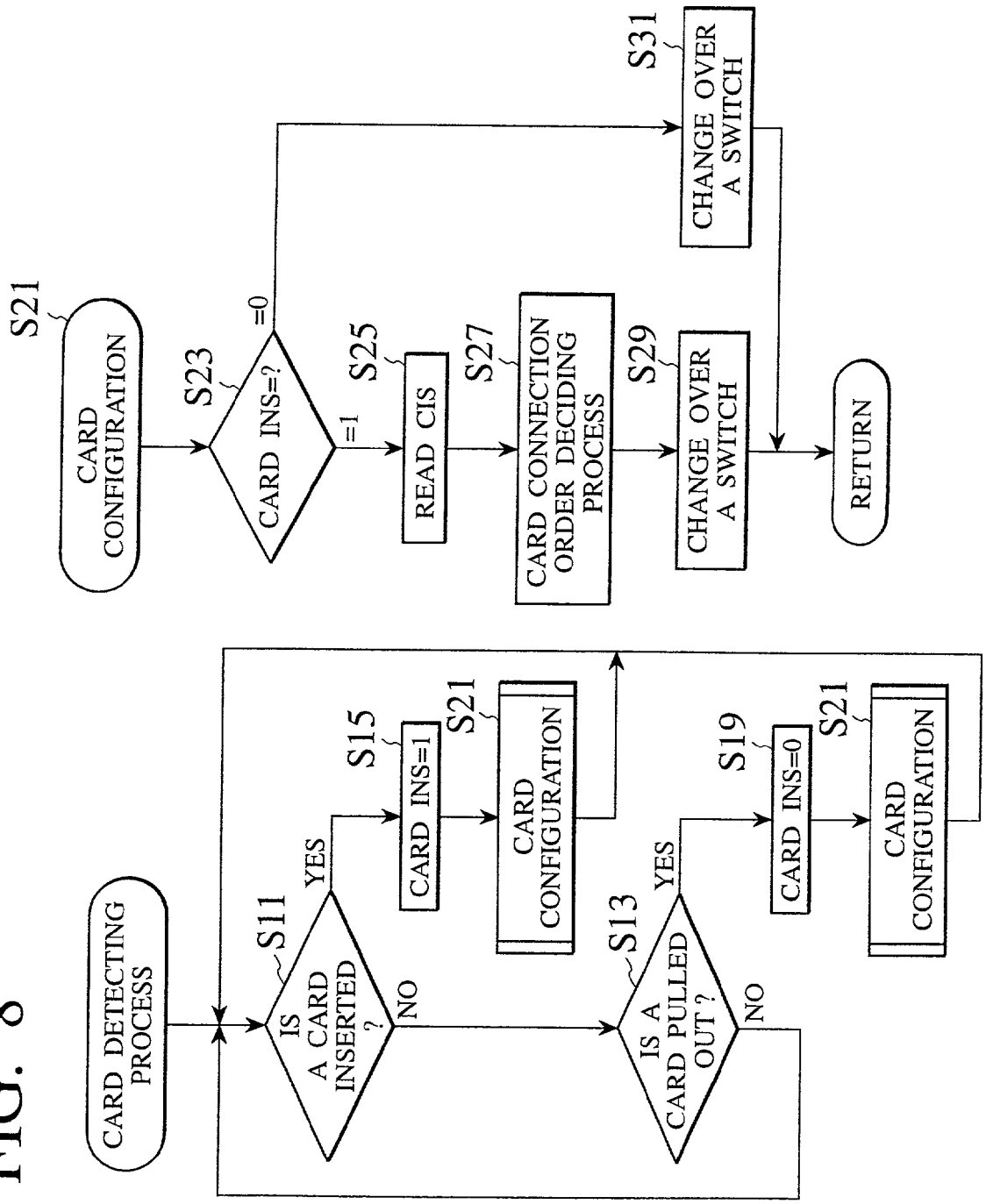
FIG. 8 is a flowchart showing an operation of the digital broadcasting receiver unit according to the first embodiment.

A control flow executed when the card having above information is inserted is shown in FIG. 8.

In the normal condition, the insertion of the card is constantly monitored at a predetermined time period to decide whether or not the card is inserted (step S11) and whether or not the card is pulled out (step S13). If the card has been inserted (if YES in step S11), Card-INS is set to "1" (step S15), then card configuration is executed (step S21), and then the process returns to step S11. If the card has been pulled out (if YES in step S13), Card-INS is reset to "0" (step S19), then the card configuration is also executed (step S21), and then the process also returns to step S11.

In the card configuration (step S21), first the state of Card-INS is decided (step S23). If Card-INS is "1" in step S23, CIS is read from the card (step S25), and then the connection order of the card which is inserted at present is decided based on the above connection priority information (step S27). Then, the switches are changed over to satisfy the order requested based on the result (step S29).

In contrast, if Card-INS is "0" in step S23, the switches are changed over so as to bypass the slot from which the card has been pulled out (step S31).

Figure 6:
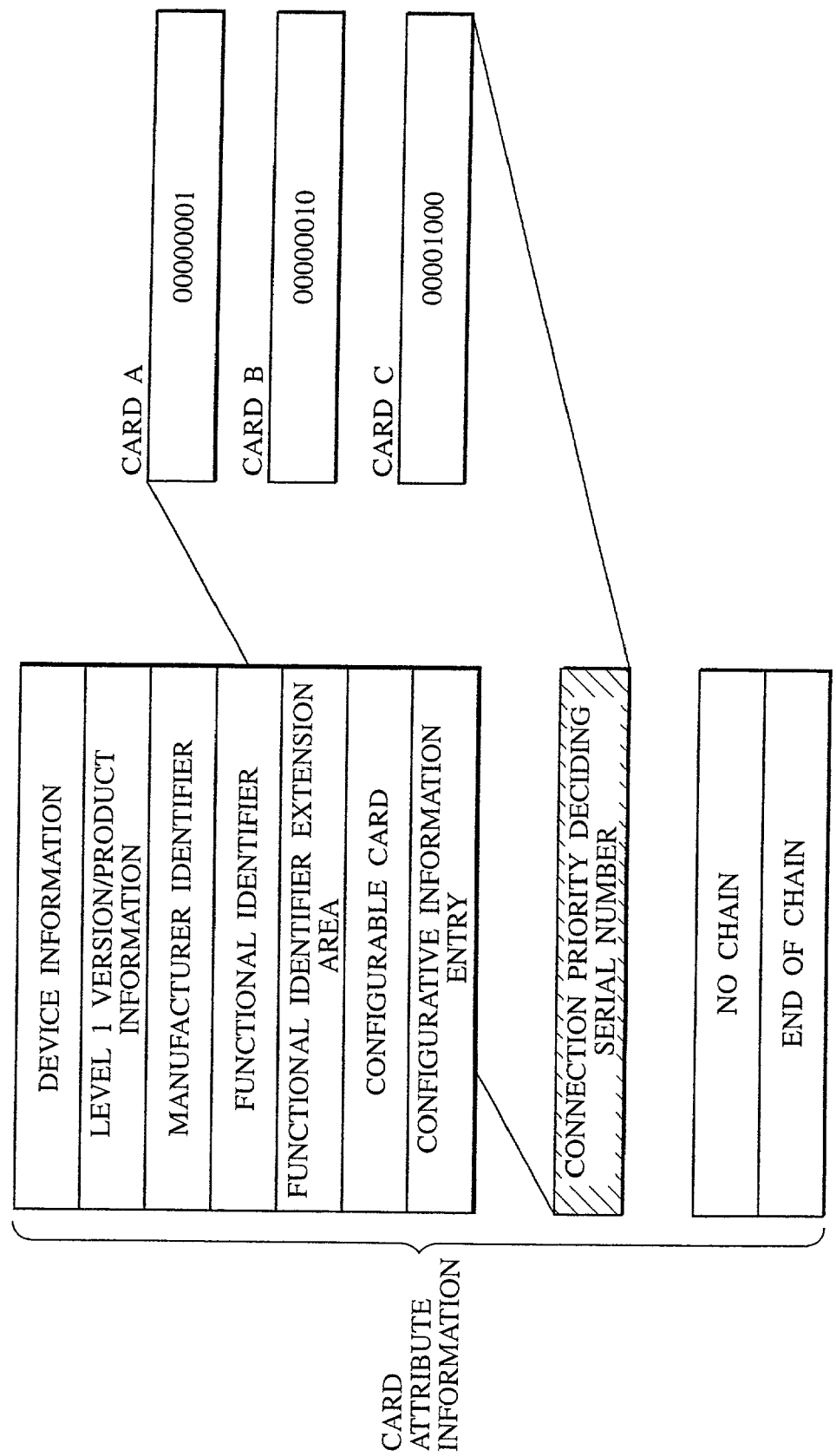
FIG. 6 is a fourth example of connection priority information utilizing the card attribute information (CIS) of PCMCIA.
Figure 7:
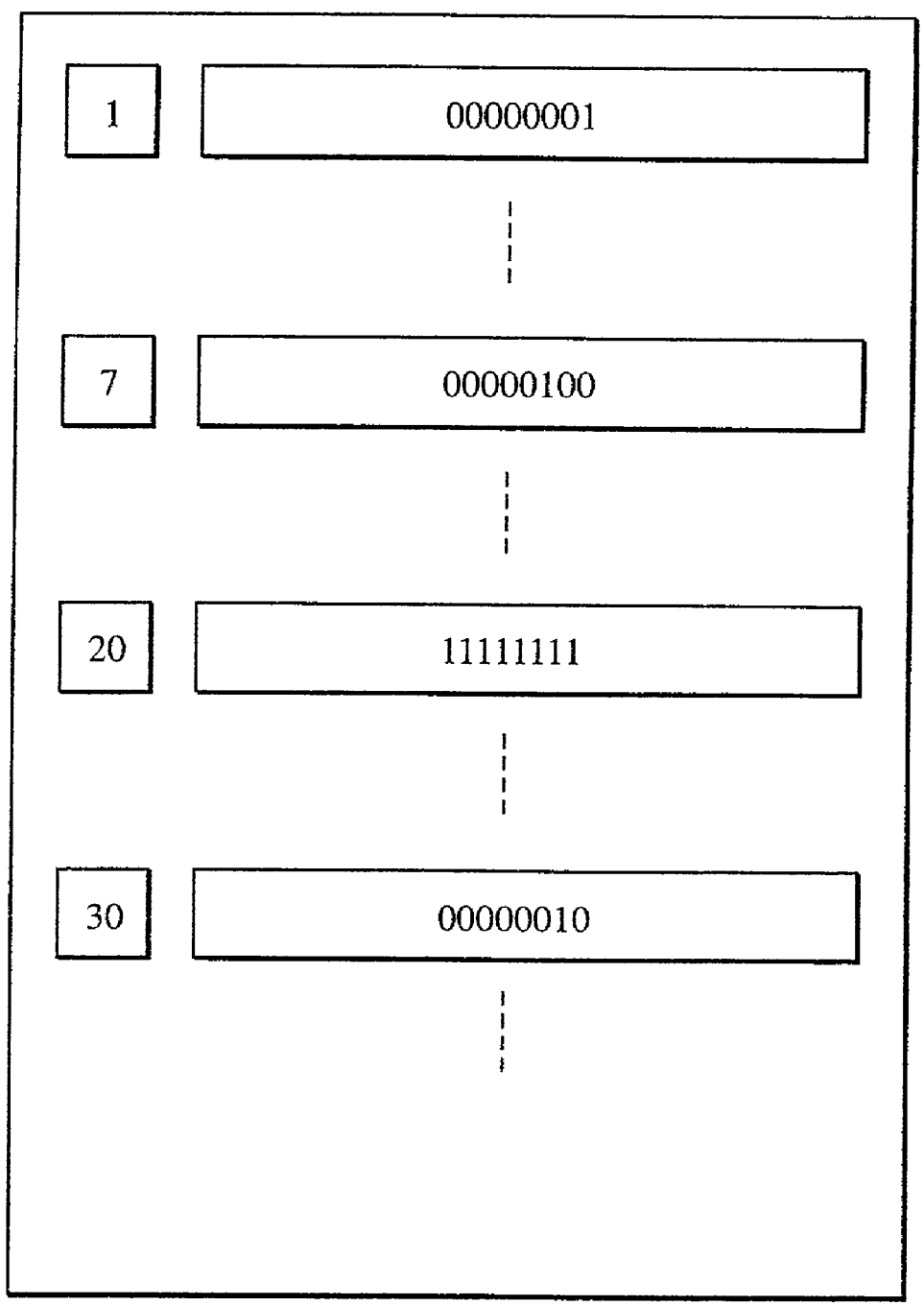
FIG. 7 is a fifth example of connection priority information utilizing the card attribute information (CIS) of PCMCIA.

Further, the case where the card has no connection information previously may be considered, and such case is shown in FIGS. 6 and 7. In FIG. 6, a connection priority deciding serial number (referred to as a "serial number" hereinafter) can be set uniquely in the card. FIG. 7 shows the data indicating the serial number and the connection priority. This data may be transmitted periodically from the broadcasting station side, otherwise the data may be provided by the media such as the telephone line, etc. The data can be saved in the location which can be referred to by the card control circuit 1016.

Furthermore, if such priority deciding information have been provided to the receiver unit side, the connection priority may be decided only by the normal card information, without setting new information such as the serial number, etc.

Moreover, the control flow has the totally similar processes, except that the above saved data are referred to in the connection order deciding process in step S27.

With the above, as the preferred embodiment, the example utilizing CIS in the digital broadcasting receiver unit has been described. The above control may be carried out by setting another information. The interface is not limited to the PCMCIA based interface. Thus, the present invention is available for the signal processing system in which the processes are executed by connecting a plurality of second units as the external units to the first unit.

As described above, according to the first embodiment of the present invention, if the daisy-chain of a plurality of second units is established by connecting various second units to a plurality of ports of the first unit, such complicated operations that the attributes of individual second units are checked previously and then the second units are connected to respective ports with regard to the connection priority can be omitted. Since the first unit can check automatically respective attributes of the second units, the plurality of second units can be connected according to the optimum connection priority.

In addition, according to the first embodiment of the present invention, since the viewer can insert a plurality of cards into a plurality of card slots without considering the insertion order, extra confusion is not brought about and thus improvement in the user interface can be yielded.

Figure 9:
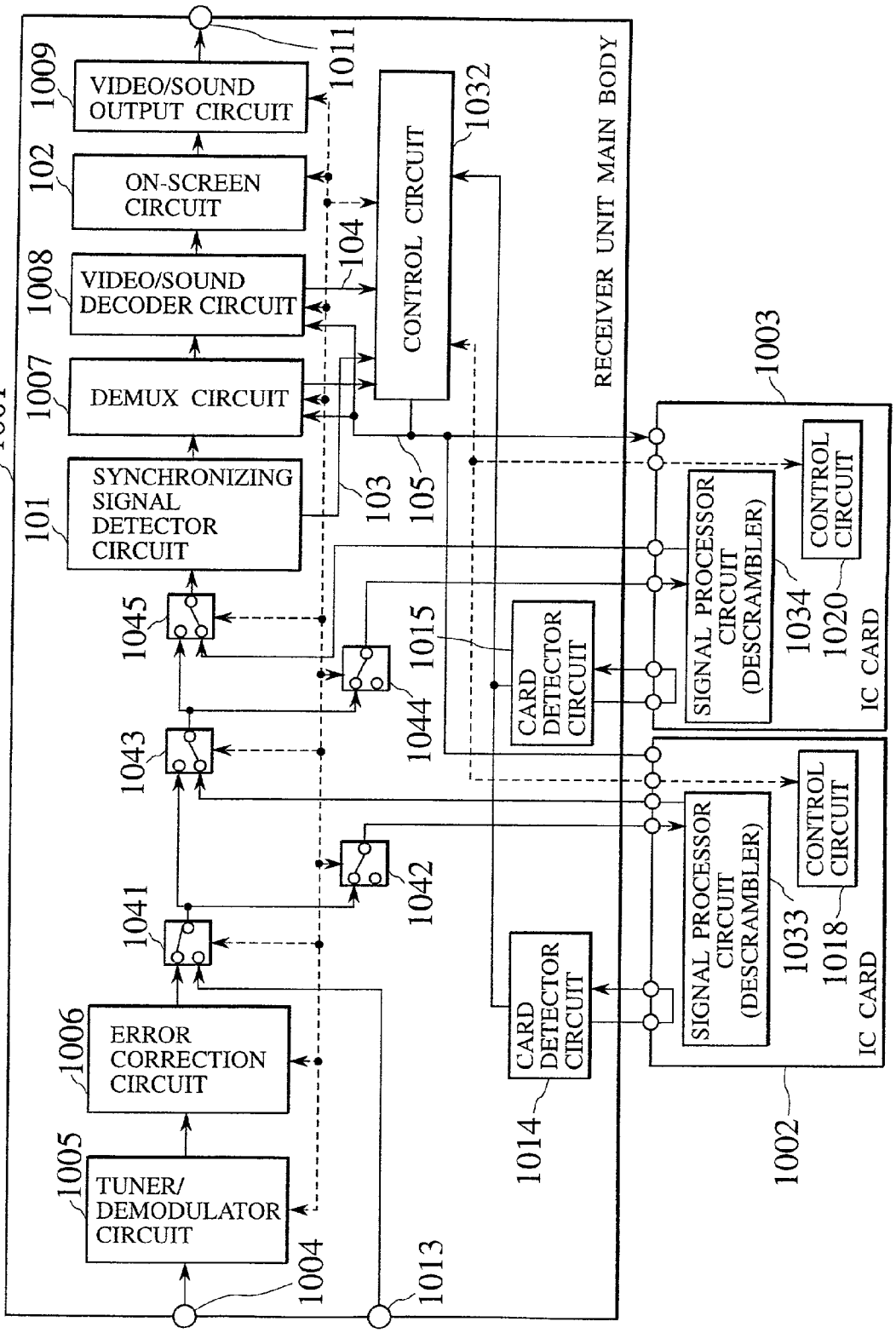
FIG. 9 is a block circuit diagram showing a configuration of a digital broadcasting receiver unit according to second and third embodiments of the present invention.
Figure 10:
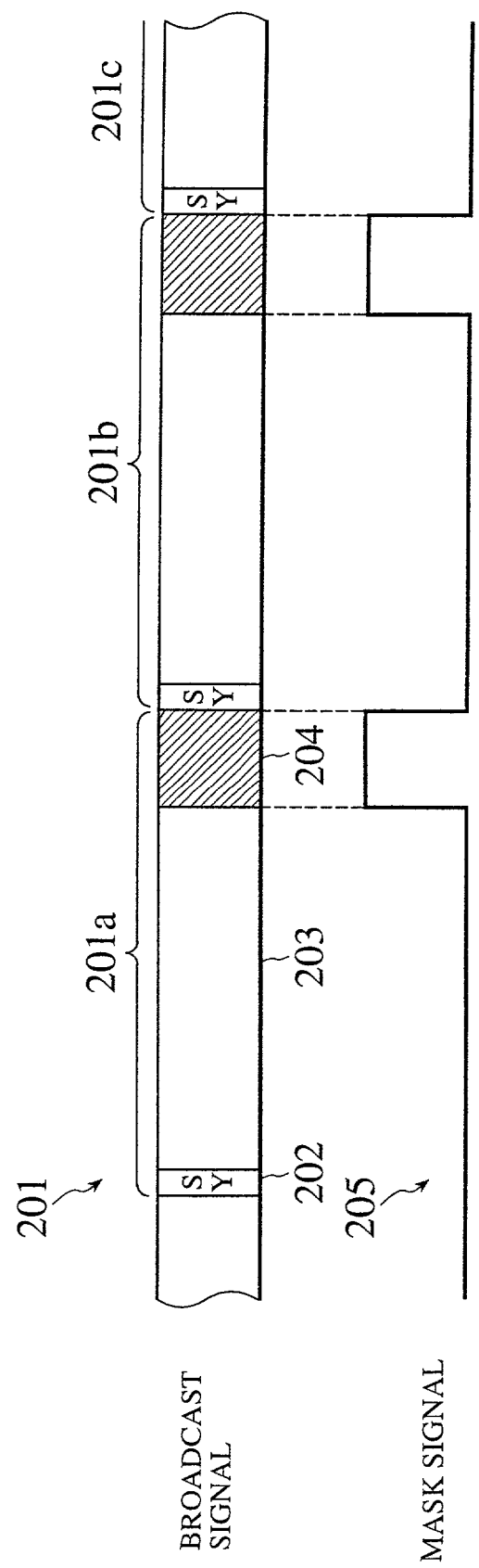
FIG. 10 is an example of a signal configuration for explaining an operation of the digital broadcasting receiver unit according to the second embodiment.
Figure 11:
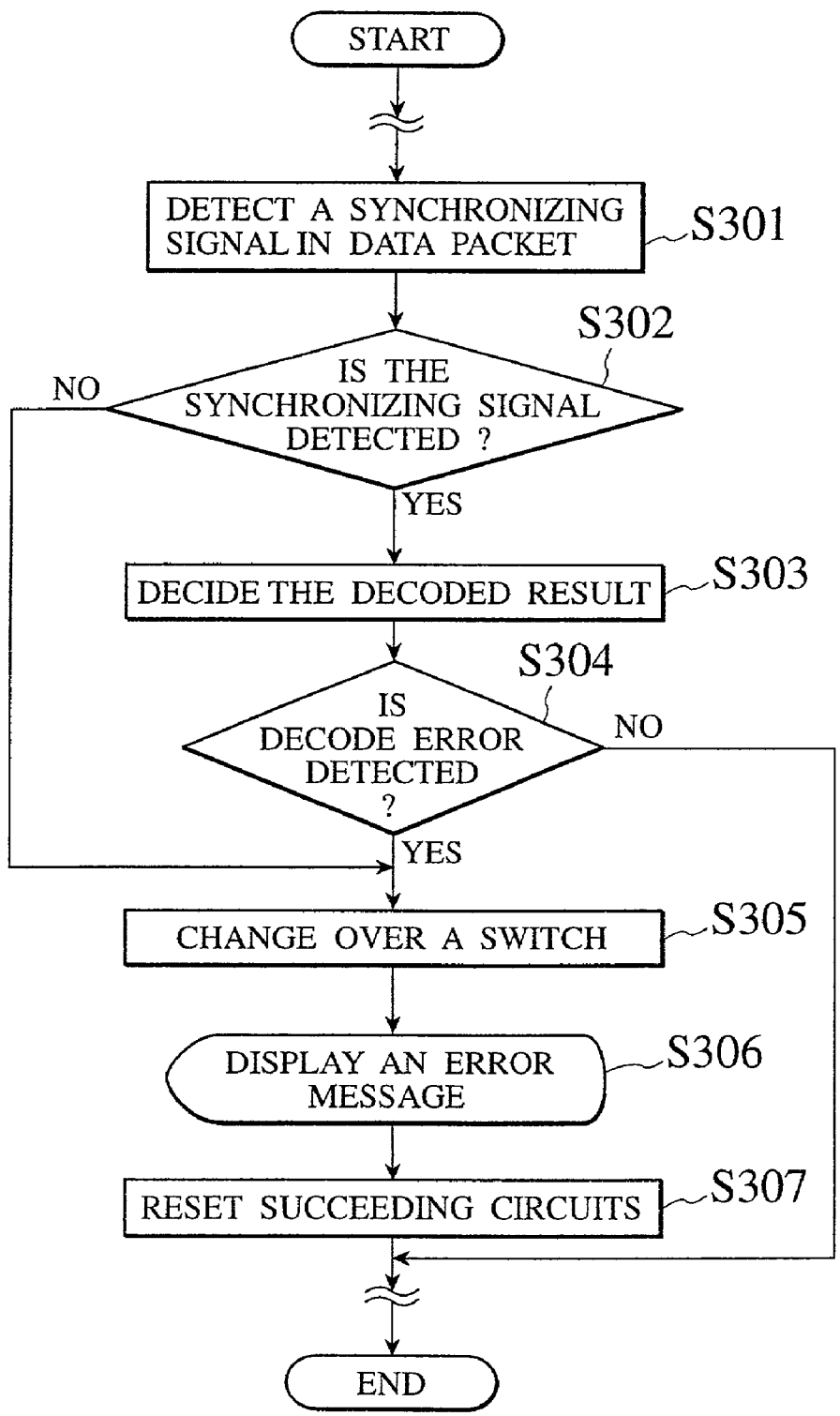
FIG. 11 is a flowchart showing an operation of the digital broadcasting receiver unit according to the second embodiment.

FIG. 9 is a block circuit diagram showing a configuration of a digital broadcasting receiver unit according to a second embodiment of the present invention. FIG. 10 is a schematic view showing a data format for explaining an example of a digital broadcasting signal stream which is received by the digital broadcasting receiver unit in FIG. 9. FIG. 11 is a flowchart showing an operation of the digital broadcasting receiver unit according to the second embodiment.

In FIG. 9, the digital broadcasting receiver unit comprises the receiver unit main body 1001 as the first unit, and the card modules 1002, 1003 as the second units which can be separated from the receiver unit main body 1001. The card modules 1002, 1003 are connected like the daisy-chain connection via the receiver unit main body 1001. Although the example in which two sheets of card modules are employed is shown in FIG. 9, one card module or three card modules or more can be connected via the receiver unit main body 1001 in the daisy-chain connection, as in the first embodiment.

The receiver unit main body 1001 comprises the tuner/demodulator circuit 1005; the error correction circuit 1006; switches 1041, 1042, 1043, 1044, 1045; the synchronizing signal detector circuit 101; the DEMUX circuit 1007; the video/sound decoder circuit 1008; the on-screen circuit 102;

the video/sound output circuit 1009; the control circuit 1032; and the card detector circuits 1014, 1015.

The card modules 1002, 1003 comprise signal processor circuits (descrambler) 1033, 1034, and control circuits 1018, 1020 respectively. The case where two sheets of card modules are connected is disclosed in this second embodiment, but three card modules or more may be employed according to the number of watched programs, etc. Though the signal processor circuits 1033, 1034 are constructed as the descrambler respectively in the second embodiment, a plurality of card modules having different functions may be connected according to the monitoring programs, etc. That is to say, the descramble card and the multiplexed text broadcasting card may be employed like the first embodiment.

In the receiver unit main body, the digital broadcasting signals which are subjected to frequency multiplexing and/or time-division multiplexing are input into the terminal 1004. The tuner/demodulator circuit 1005 selects the signal of a desired frequency from the broadcasting signals input from the terminal 1004 and then demodulates the signal. The error correction circuit 1006 corrects errors of the broadcasting signals caused during transmission by using the error correcting code attached to the signal. The error correction circuit 1006 will be explained later in more detail. Normally, an output signal stream of the error correction circuit 1006 has a format of MPEG-SYSTEM (ISO/IEC13818-1), in which a plurality of time-division multiplexed program signals are contained.

This signal stream is input into the switch 1041 and a signal supplied from a terminal 1013 is also input into the switch 1041. Thus, the switch 1041 can change these input signals over selectively. The signals from the signal generating unit such as VTR, DVD, etc. provided on the outside of the receiver unit can be input into the terminal 1013.

As shown in FIG. 9, in case the card modules 1002, 1003 are connected to the receiver unit main body 1001, the card detector circuits 1014, 1015 detect respective connections and then transmit the detected result to the control circuit 1032 respectively. The control circuit 1032 as a rule changes the switches 1042, 1043, 1044, 1045 over according to the detected result. In other words, in case the card modules 1002, 1003 are connected to the receiver unit main body 1001, the control circuit 1032 controls the switches 1042, 1043, 1044, 1045 such that the signal stream from the switch 1041 can be input into the synchronizing signal detector circuit 101 via the card modules 1002, 1003. Conversely, in case any one of the card modules 1002, 1003 is pulled out from the receiver unit main body 1001, the control circuit 1032 controls the switches not to flow the signal stream to the slot which corresponds to the concerned card module.

Like the first embodiment, the processes effected in the signal processor circuits (descramblers) 1033, 1034 provided in the card modules 1002, 1003 are applied only to the necessary portion of the input signal stream, but such processes are not applied to the unnecessary portion of the input signal stream. For example, two descramble cards are connected in the second embodiment shown in FIG. 9, but each of the descramble cards selects only the concerned programs from the signal stream on which a plurality of programs are superposed, and then applies the descrambling process to them.

The DEMUX circuit 1007 selects necessary signals from the time-division multiplexed broadcasting signals. The video/sound decoder circuit 1008 decodes the video/sound signals which have been compressed and encoded in digital fashion. The video/sound output circuit 1009 executes the D/A conversion, the format conversion, etc. These processes are similar to those in the first embodiment. Further, while carrying out the communication with the control circuit 1032 in the receiver unit main body, the control circuits 1018, 1020 in the card modules 1002, 1003 control the signal processor circuits (descramblers) 1033, 1034 respectively.

Features of the second embodiment are given as the following points. Specifically, the synchronizing signal detector circuit 101 for outputting a synchronizing signal detecting signal is provided at the preceding stage of the DEMUX circuit 1007. The video/sound decoder circuit 1008 outputs newly an error detecting signal 104 to the control circuit 1032. Further, the on-screen circuit 102 for multiplexing the display data such as characters, etc. is provided at the succeeding stage of the video/sound decoder circuit 1008. The control circuit 1032 performs the separation control of the defective card modules by executing the change-over control of the switches based on the synchronizing signal detecting signal 103 and the error detecting signal 104, and also resets the circuits connected succeedingly to the defective card module by outputting a RESET signal 105.

The broadcasting signal 201 in FIG. 10 shows a data format of the normal digital broadcasting signal which is employed by the digital broadcasting receiver unit according to the present invention. A synchronizing signal 202, a payload (data portion) 203, and an error correcting code 204 constitute one packet 201*a*. Successive packets 201*a*, 201*b*, 201*c*, . . . , constitute the broadcasting signal 201.

The error correction circuit 1006 in FIG. 9 executes the calculation based on the payload 203 and the error correcting code 204 to correct the errors, then corrects errors of the data in the payload 203 according to the calculation result, and then output them to the succeeding stage. In other words, because the error correcting code has discharged its duty after the error correction has been done, such error correcting code 204 of the broadcasting signal 201 becomes useless (this is called an "invalid portion" hereinafter).

A mask signal 205 in FIG. 10 is a signal indicating the invalid portion (H level) of the broadcasting signal 201. The broadcasting signal 201 and the mask signal 205 are transmitted to the succeeding stage via routes of the switches 1041, 1042, the signal processor circuit (descrambler) 1033 in the card module 1002, the switches 1043, 1044, the signal processor circuit (descrambler) 1034 in the card module 1003, and the switch 1045.

As described above, the switch 1043 is a switch which changes selectively over the broadcasting signal which has been subjected to the descramble process by the card module 1002 and the broadcasting signal which has bypassed the card module 1002. In the second embodiment, the control circuit 1032 not only switches simply the switch 1043 based on whether or not the card is detected by the card detector circuit 1014, but also switches the switch 1043 based on the synchronizing signal detecting signal 103 from the synchronizing signal detector circuit 101 and the decode error detecting signal 104 from the video/sound decoder circuit 1008. In other words, when the control circuit 1032 decides, based on the synchronizing signal detecting signal 103 and the error detecting signal 104, that any trouble is caused in the card module 1002, such control circuit 1032 switches the switch 1043 to input the signal for bypassing the card module 1002 instead of the output signal of the card module 1002.

The switch 1042 is also switched simultaneously with the switching of the switch 1043. When the switch 1043 is controlled to select the signal which bypasses the card module 1002, the switch 1042 is turned OFF not to output the broadcasting signal to the slot to which the card module 1002 is connected.

The switch 1045 and the switch 1044 are controlled similarly as above with respect to the card module 1003.

Next, an operation will be explained with reference to the flowchart in FIG. 11 hereunder. In the operation of the digital broadcasting receiver unit, the synchronizing signal detector circuit 101 detects the synchronizing signal in the broadcasting signal 201 of data packet (step S301). Then, normality of the synchronizing signal is decided (step S302). If the synchronizing signal has been detected normally, the video/sound decoder circuit 1008 evaluates then the decoded result (step S303) and then it is decided whether or not the decode error is detected (step S304).

If it has been decided in step S302 that the synchronizing signal is normal and it has been decided in step S304 that no decode error is detected, the card module is then regarded as normal and thus the process is ended.

If it has been decided in step S302 that the synchronizing signal is abnormal or it has been decided in step S304 that the decode error is detected, the card module is then regarded as abnormal. Then, in step S305, the switch 1043 or the switch 1045 is changed over such that the signal stream can bypass the card module and simultaneously the switch 1043 or the switch 1045 is switched to be opened. As a result, the card module can be disconnected from the receiver unit main body.

Figure 14:
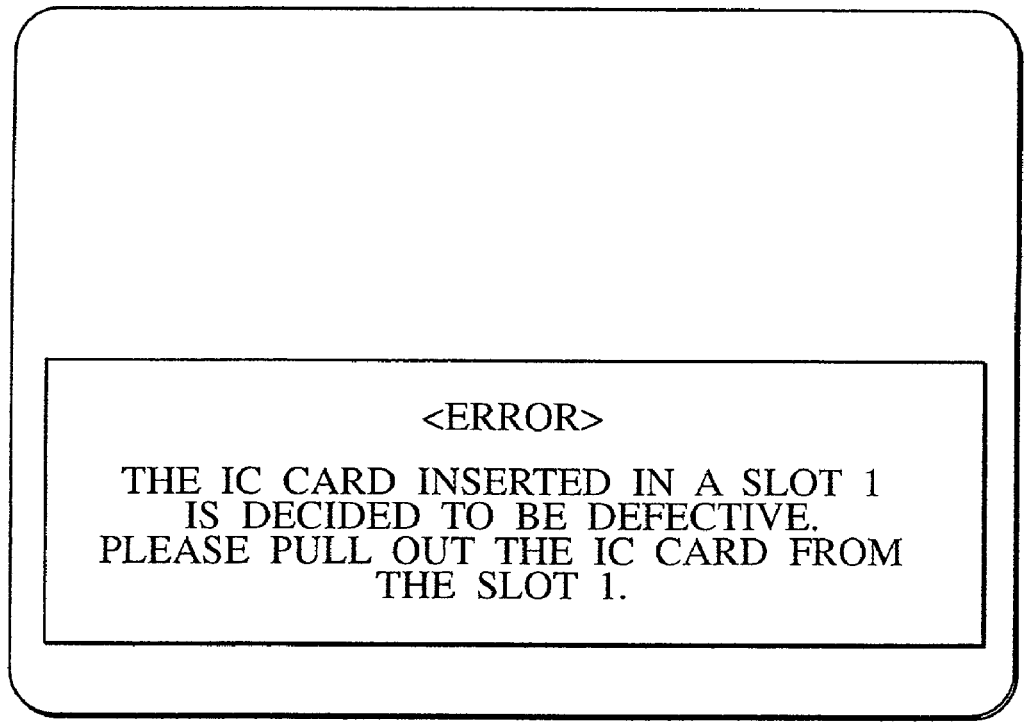
FIG. 14 is an example of a message for displaying a defective card module on a screen.

Then, in step S306, an error message informing that the card module is defective, as shown in FIG. 14, is displayed on a screen by the on-screen circuit 102. Although the example employing the on-screen circuit is described in the second embodiment, a display device such as LED provided on a panel surface, etc. of the receiver unit main body, a fluorescent display tube, a liquid crystal display device, etc. may be employed. Then, in step S307, the control circuit 1032 outputs the RESET signal 105 to reset the succeeding circuits following to the card module.

Figure 12:
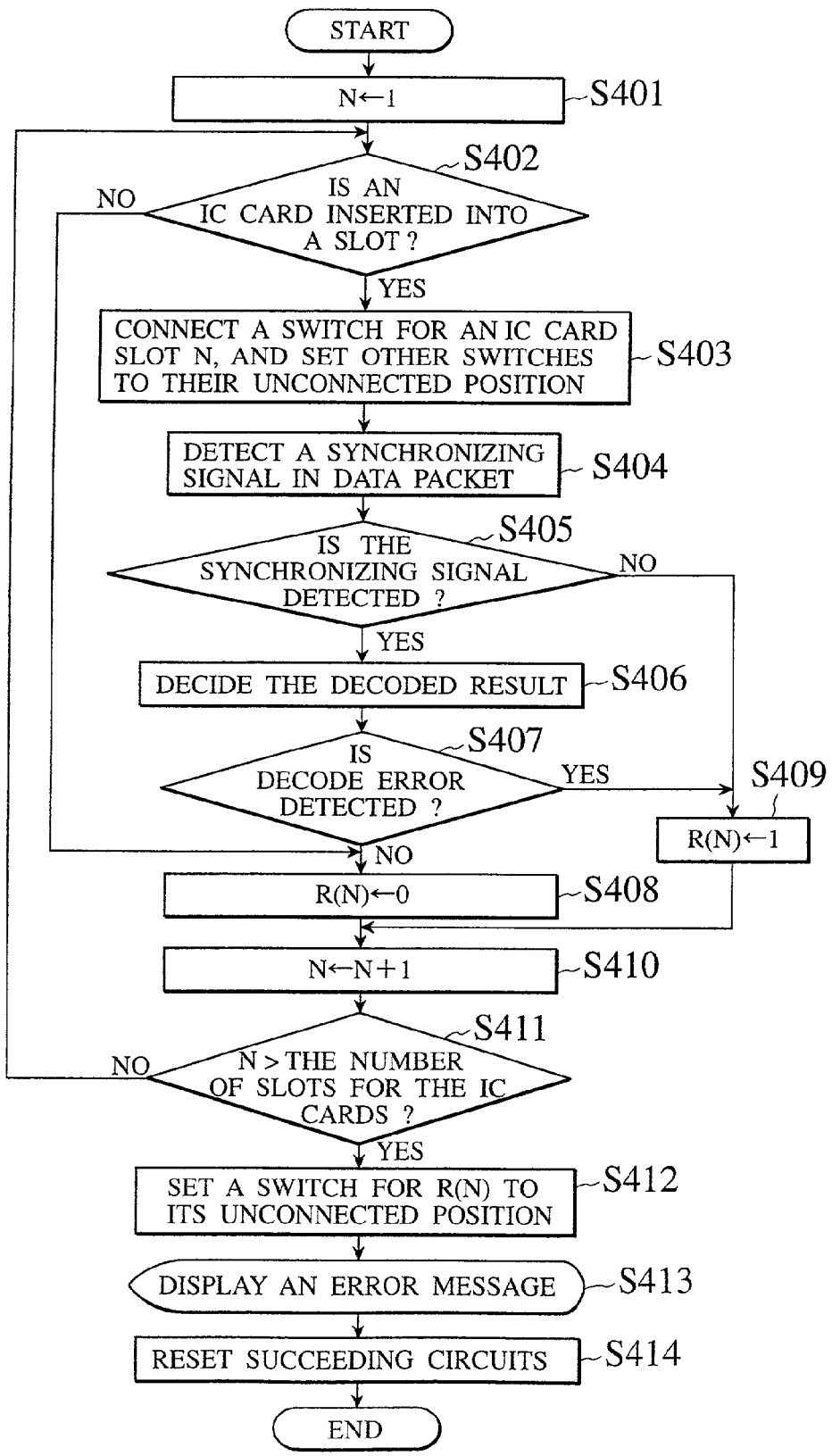
FIG. 12 is a flowchart showing an operation of the digital broadcasting receiver unit according to the third embodiment.

Next, an operation of the digital broadcasting receiver unit according to a third embodiment will be explained with reference to FIGS. 9 and 12 hereunder. In the third embodiment, the switches for switching the broadcasting signal which is processed by the card modules and the signal which bypasses the card modules are changed over sequentially, then the card modules are connected to the receiver unit main body one by one, then a diagnostic function for detecting the synchronizing signal and the decode error is carried out under the condition that each card module is connected, and then only the defective card module(s) is(are) disconnected based on the diagnostic result to reconstruct the receiver system.

First, in step S401, a variable N is initialized to "1". This variable N is a variable showing a slot number for a card module, and thus the slots for the card module are numbered from 1 to the number of slots. In step S402, it is detected by the card detector circuit 1014 or 1015 whether or not the card modules are inserted into the slots of the receiver unit main body. Unless the card modules are inserted, processes for deciding the normality of the card modules (steps S403 to S407) are skipped.

If any card module is inserted into the slots, the processes for deciding the normality of the card modules are carried out. In step S403, the switch corresponding to the slot N for the card module is set to the connected position, and other switches are set to their unconnected position. For example, in the case that the card module 1002 is inserted to decide the normality thereof, the switch 1042 is set to the connection side, the switch 1043 is set to the card module output side, the switch 1044 is set to the open side, and the switch 1045 is set to the card module bypass side. Thus, only the card module 1002 serving as the decision object can be connected to the receiver unit main body 1001, and then the card module 1002 is decided.

In steps S404 to S407, each card module is processed in the same way as the decision processes (steps S301 to S304) in FIG. 11. A result flag R(N) is set to "0" in step S408 if the card module is decided to be normal, while the result flag R(N) is set to "1" in step S409 if the card module is decided to be abnormal. Where R is an array consisting of elements which are of the same number as the number of slots and to which one bit value can be set respectively, and R(N) is a flag indicating a value of the N-th element in the array R, i.e., the state of the card module which is inserted into the N-th slot.

Then, in step S410, a value 1 is added to N to decide the next card module. Then, in step S411, it is decided whether or not N exceeds the number of slots for the card modules. If N exceeds the number of slots for the card modules, a series of decision processes are ended. In contrast, if N is less than the number slots for the card modules, the next card module is similarly decided. Finally, like FIG. 11, the processes in the steps S412 to S414 are applied to the card module slot which has been decided as abnormal based on the value R(N).

Figure 13:
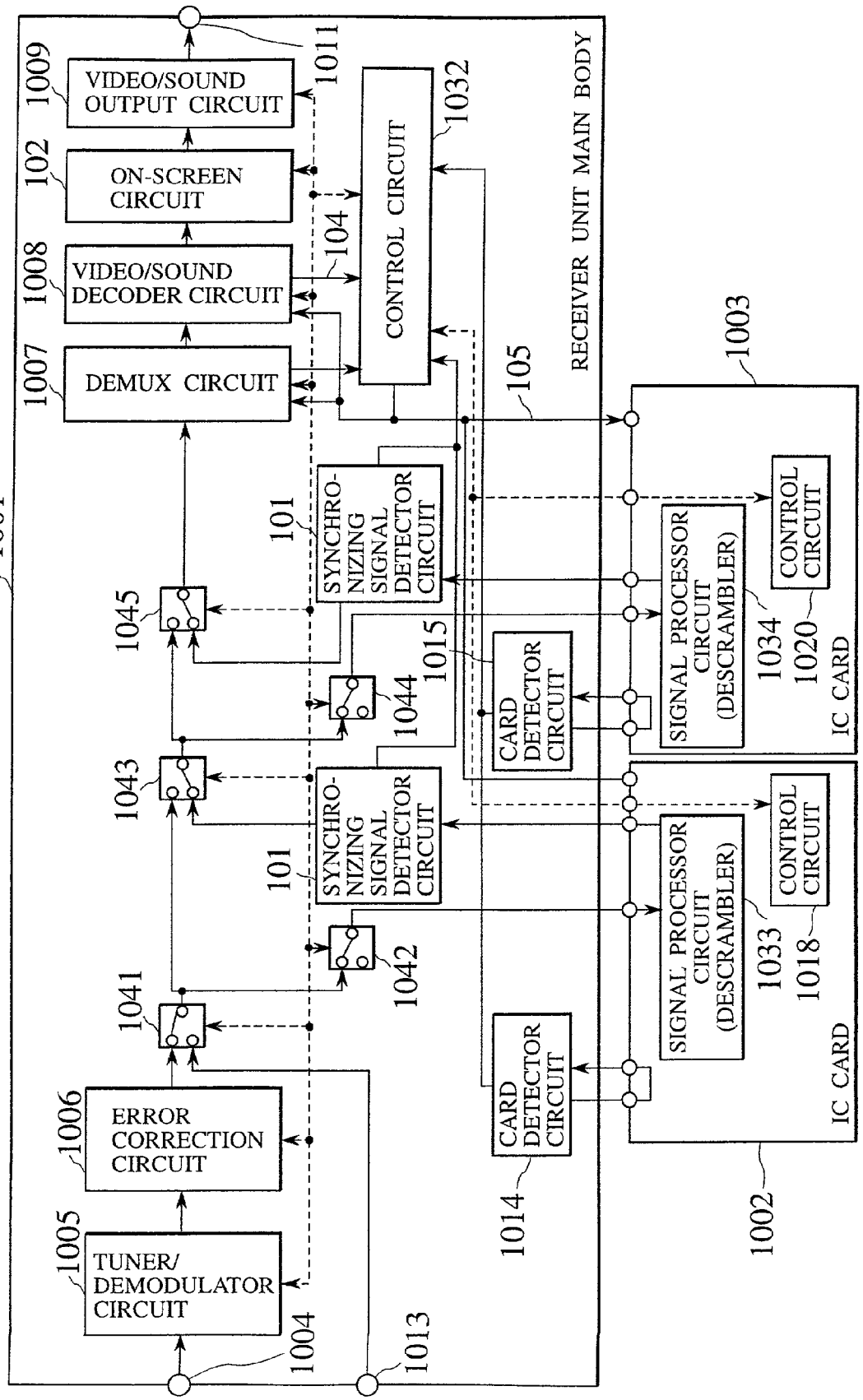
FIG. 13 is a block circuit diagram showing a configuration of a digital broadcasting receiver unit according to a fourth embodiment of the present invention.

Next, a configuration of a digital broadcasting receiver unit according to a fourth embodiment of the present invention will be explained with reference to FIG. 13 hereunder. A difference between this fourth embodiment and the second embodiment shown in FIG. 13 resides in that the synchronizing signal detector circuits 101 are provided to correspond to output signals of the card modules respectively.

More particularly, in the receiver unit main body 1001, the synchronizing signal detector circuits 101 are provided to respective portions which receive the broadcasting signal outputs of the card modules. In the example in FIG. 13, the synchronizing signal detector circuits 101 are placed in the input portions of the switch 1043 and the switch 1045. But the synchronizing signal detector circuits 101 may be placed in the output portions of the switch 1043 and the switch 1045. Like the second and third embodiments, the normality decision process for the card modules and the disconnection process for the defective card modules are similarly carried out by controlling the switches.

According to the fourth embodiment described above, the digital broadcasting receiver unit, in which one or more replaceable card modules are connected in the daisy-chain connection via the main body of the digital broadcasting receiver unit, with the excellent fault-tolerance can be provided. In other words, the digital broadcasting receiver unit can decide the failure of the card modules by detecting the synchronizing signal from the broadcasting signal outputs from the card modules or by detecting the decode error, and can continue the functions other than the defective cards by disconnecting the defective card modules from the system to switch the signals by the switches and to thus bypass the defective card modules or by resetting succeeding card modules and circuits subsequent to the defective card module.

In addition, if some card modules are defective, the large influence of them upon the remaining receiver system can be prevented as a whole.

Further, the user can know the failure contents by displaying detected contents of the failure, so that the user can deal quickly with the failure accident.

Figure 15:
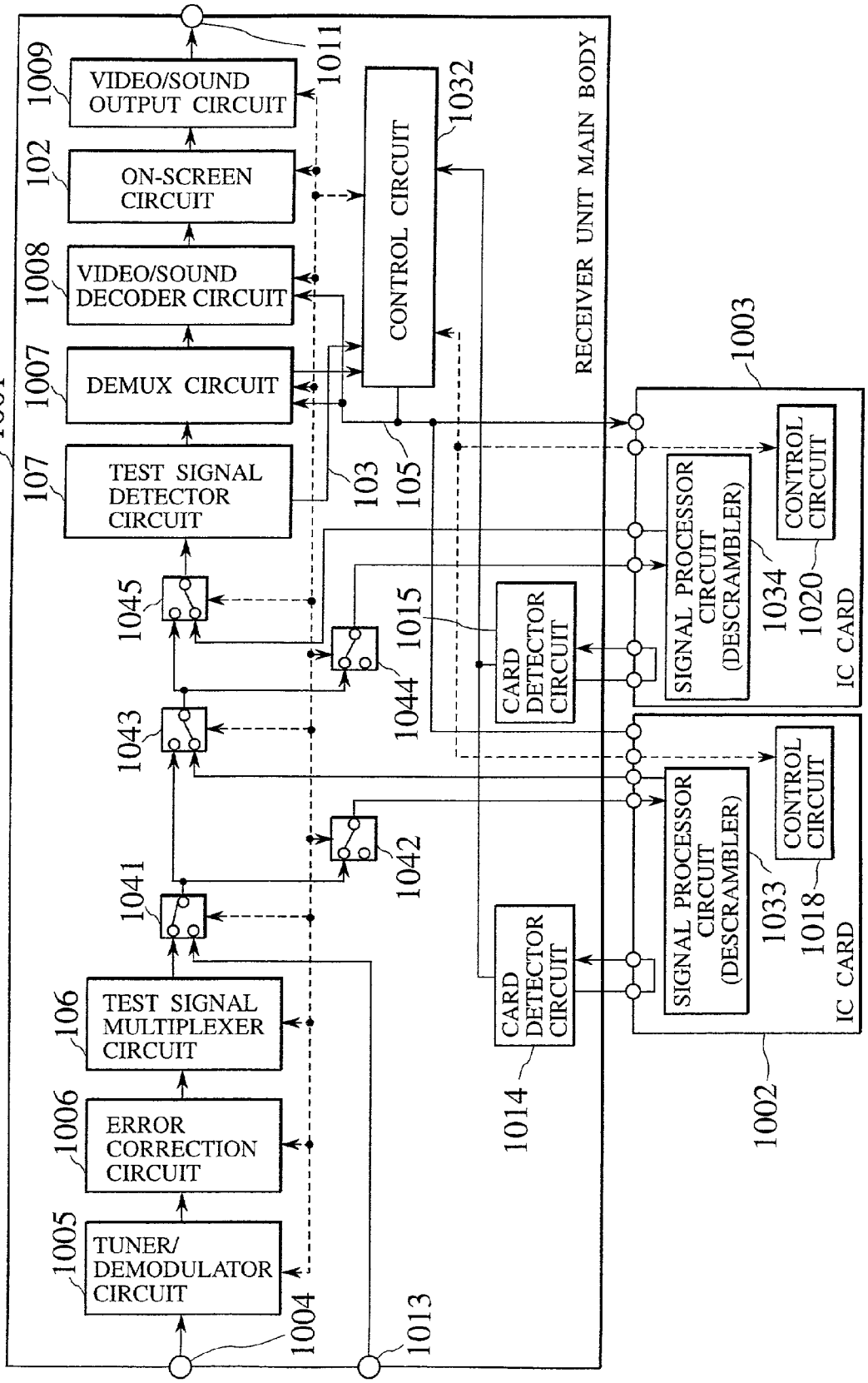
FIG. 15 is a block circuit diagram showing a configuration of a digital broadcasting receiver unit according to fifth and sixth embodiments of the present invention.

FIG. 15 is a block circuit diagram showing a configuration of a digital broadcasting receiver unit according to a fifth embodiment of the present invention.

A difference between the fifth embodiment and the second embodiment is that a test signal multiplexer circuit 106 for multiplexing the broadcasting signal with the test signal is provided at the succeeding stage of the error correction circuit 1006 and also a test signal detector circuit 107 for detecting the test signal which is multiplexed with the broadcasting signal is provided at the preceding stage of the DEMUX circuit 1007, in place of the synchronizing signal detector circuits 101.

The test signal multiplexer circuit 106 multiplexes the broadcasting signal, in which the transmission error has been corrected by the error correction circuit 1006, with the test signal. This test signal may be read from a test signal memory portion (not shown) provided in the test signal multiplexer circuit 106, or may be generated in the test signal multiplexer circuit 106 according to the control by the control circuit 1032. Further, the test signal may be read from a memory portion (not shown) provided in the control circuit 1032 and then supplied to the test signal multiplexer circuit 106. As the test signal, particular constant, random number, etc. may be employed.

Figure 16:
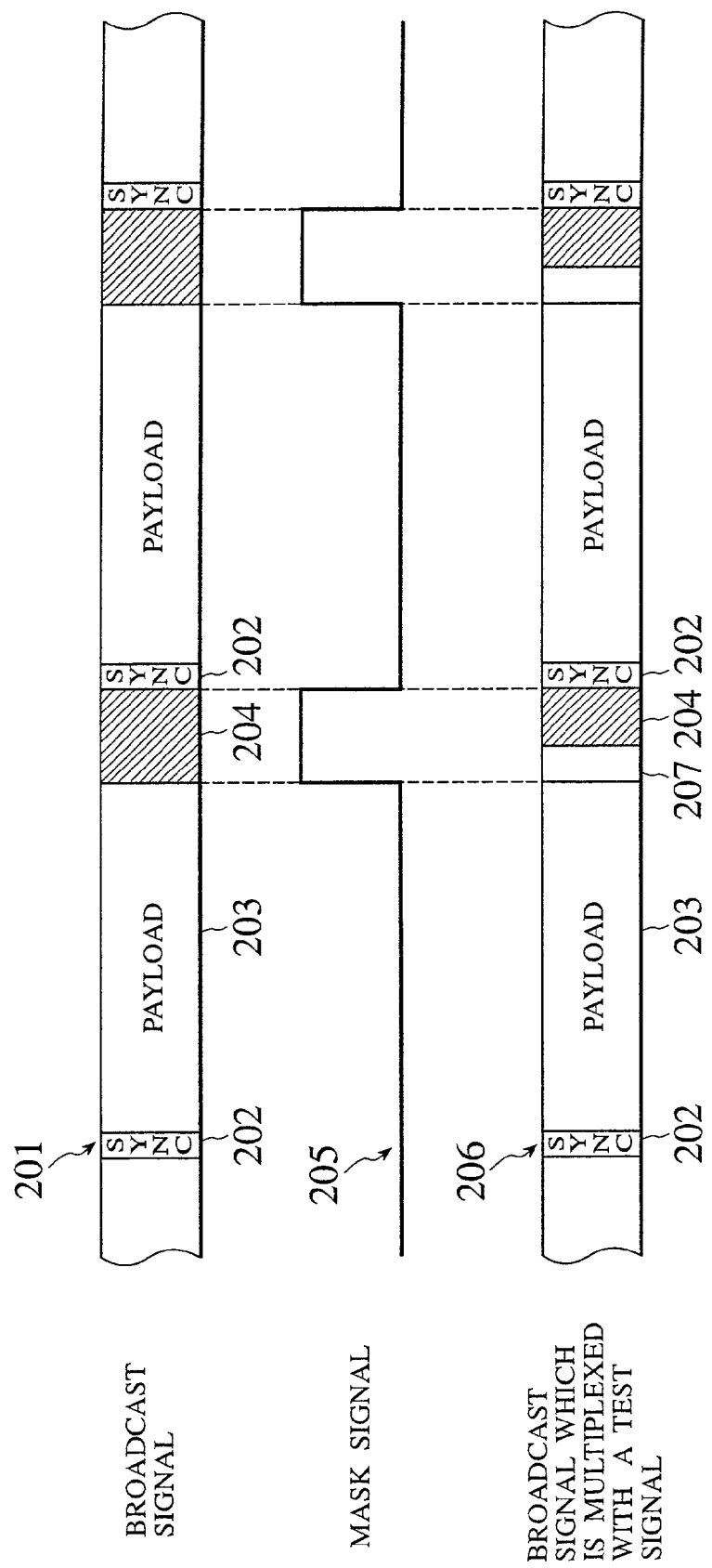
FIG. 16 is an example of signal configurations for explaining test signal insertion positions in the fifth embodiment.

FIG. 16 is a view showing multiplexing procedures of the test signal.

The broadcasting signal 201 in FIG. 16 shows a data format of the ordinary broadcasting signal. A synchronizing signal (SYNC) 202, a payload 203, and an error correcting code (ECC) 204 constitute one packet. A series of packets constitute the broadcasting signal 201.

The error correction circuit 1006 in FIG. 15 executes an error correcting operation based on the payload 203 and the error correcting code 204 to correct errors in the transmission data and then outputs the corrected data to the succeeding circuits. In other words, they act as invalid portion of the error correcting code 204 in the broadcasting signal 201 in which the errors are corrected.

A mask signal 205 in FIG. 16 is a signal showing the invalid portion (H level) of the broadcasting signal 201. The broadcasting signal 201 is multiplexed with the test signal by the test signal multiplexer circuit 106, like the broadcasting signal 201 shown in FIG. 16. The example in FIG. 16 shows the case where the test signal 207 is superposed on the invalid portion.

As the test signal, particular constant, random number, etc. may be employed. The broadcasting signal 201, which is multiplexed with the test signal 207, and the mask signal 205 are propagated to the succeeding circuits via a route consisting of the switches 1041, 1042, the signal processor circuit (descrambler) 1033 in the card module 1002, the switches 1043, 1044, the signal processor circuit (descrambler) 1034 in the card module 1003, and the switch 1045.

An output of the switch 1045 is connected to an input of the test signal detector circuit 107. The test signal detector circuit 107 detects portions of the test signal from the broadcasting signal, and then sends out the detected signal 108 to the control circuit 1032, and also sends out the ordinary broadcasting signal other than the test signal to the DEMUX circuit 1007 at the succeeding stage. The ordinary broadcasting signal is processed ordinarily by the DEMUX circuit 1007 and subsequent circuits.

The test signal detector circuit 107 is a circuit which can decide the normality of the card module by deciding whether or not the test signal which is multiplexed to the broadcasting signal fed from the final stage of the card module is the correct test signal. For example, the test signal detector circuit 107 compares the test signal read from a built-in memory portion or generated internally with the test signal fed from the switch 1045, then decides the normality of the card modules 1002, 1003, and then transmits the detected result to the control circuit 1032 by the detection signal 108.

The control circuit 1032, when receives the detection signal 108, separates the card modules which are decided to be not normal from the receiver unit main body 1001, and resets the card modules located after the defective card module and/or the circuit portions of the receiver unit main body 1001 connected succeedingly to the defective card module by the RESET signal 105.

Also, the control circuit 1032 informs the on-screen circuit 102 of the test result. Like the second embodiment, the on-screen circuit 102 edits a message indicating the contents of the normality test result, as shown in FIG. 14, then superposes the message on the video signal, and then displays them on the TV screen.

In the fifth embodiment, the error detecting signal 104 output from the video/sound decoder circuit 1008 in the second embodiment is not needed.

Next, an operation of the digital broadcasting receiver unit according to the fifth embodiment will be explained with reference to a flowchart in FIG. 17 hereunder. In step S501, the test signal multiplexer circuit 106 multiplexes the broadcast signal 201 with the test signal. In step S502, the test signal detector circuit 107 detects the test signal from the broadcasting signal 201 output from the card module. Then, in step S503, it is decided whether or not detection of the test signal is succeeded. If it has been decided in step S503 that the detected test signal is normal, the card module is regarded as a normal module and thus the process is ended. In contrast, if it has been decided in step S503 that the test signal cannot be detected or the test signal cannot be decided as the correct test signal, the card module is then regarded as abnormal. Then, in step S504, the switch 1041 or the switch 1043 is changed over to bypass the card module and also the switch 1042 or the switch 1044 is switched to be opened.

As a result, the card module can be disconnected from the receiver unit main body 1001. Then, in step S505, an error message as shown in FIG. 14 is displayed on the screen by the on-screen circuit 102. Although the example employing the on-screen circuit is described in the fifth embodiment, a lamp display such as LED provided on a panel surface (not shown) of the receiver unit main body, etc. may be employed. Then, in step S506, the control circuit 1032 outputs the RESET signal 105 to reset succeeding circuits such as the DEMUX circuit 1007, the video/sound decoder circuit 1008, etc. or reset the card module.

Figure 18:
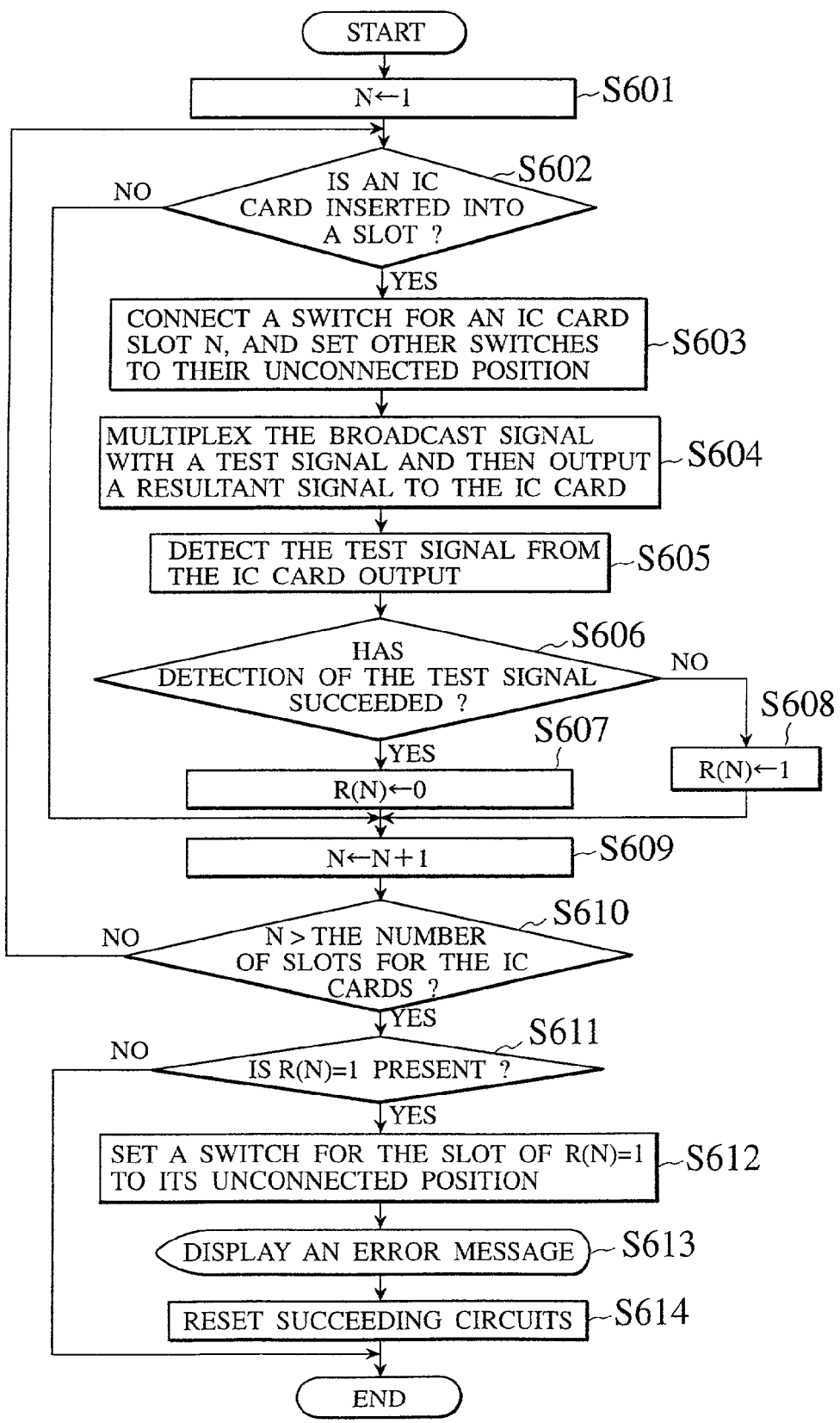
FIG. 18 is a flowchart showing an operation of the digital broadcasting receiver unit according to the sixth embodiment.

Next, a digital broadcasting receiver unit according to a sixth embodiment will be explained with reference to a block diagram of FIG. 15 and a flowchart of FIG. 18 hereunder.

First, in step S601, a variable N is initialized to "1". The variable N is a variable showing a slot number for a card module, and thus the slots for the card module are numbered from 1 to the number of slots. In step S602, it is detected by the card detector circuit 1014 or 1015 whether or not the card modules are inserted into the slots of the receiver unit main body. Unless the card modules are inserted, the normality deciding processes are skipped.

If the card modules are inserted into the slots, the normality deciding processes are carried out. In step S603, the switch which corresponds to the slot N for the card module is set to the connection position, and other switches are set to their unconnected position. For example, in the case that the card module 1002 is inserted to decide the normality thereof, the switch 1042 is set to the connection side, the switch 1043 is set to the card module output side, the switch 1044 is set to the open side, and the switch 1045 is set to the card module bypass side. Thus, only the card module 1002 can be decided. In steps S604 to S606, each card module is processed in the same way as the decision processes (steps S501 to S503) in FIG. 17. A result flag R(N) is set to "0" in step S607 if the card module is decided to be normal, whereas the result flag R(N) is set to "1" in step S408 if the card module is decided to be abnormal.

Then, in step S609, a value 1 is added to N to decide the next card module. Then, in step S610, it is decided whether or not N exceeds the number of slots for the card modules. If N exceeds the number of slots for the card modules, a series of decision processes are ended. In contrast, if N is less than the number of slots for the card modules, the next card module is similarly decided.

Figure 17:
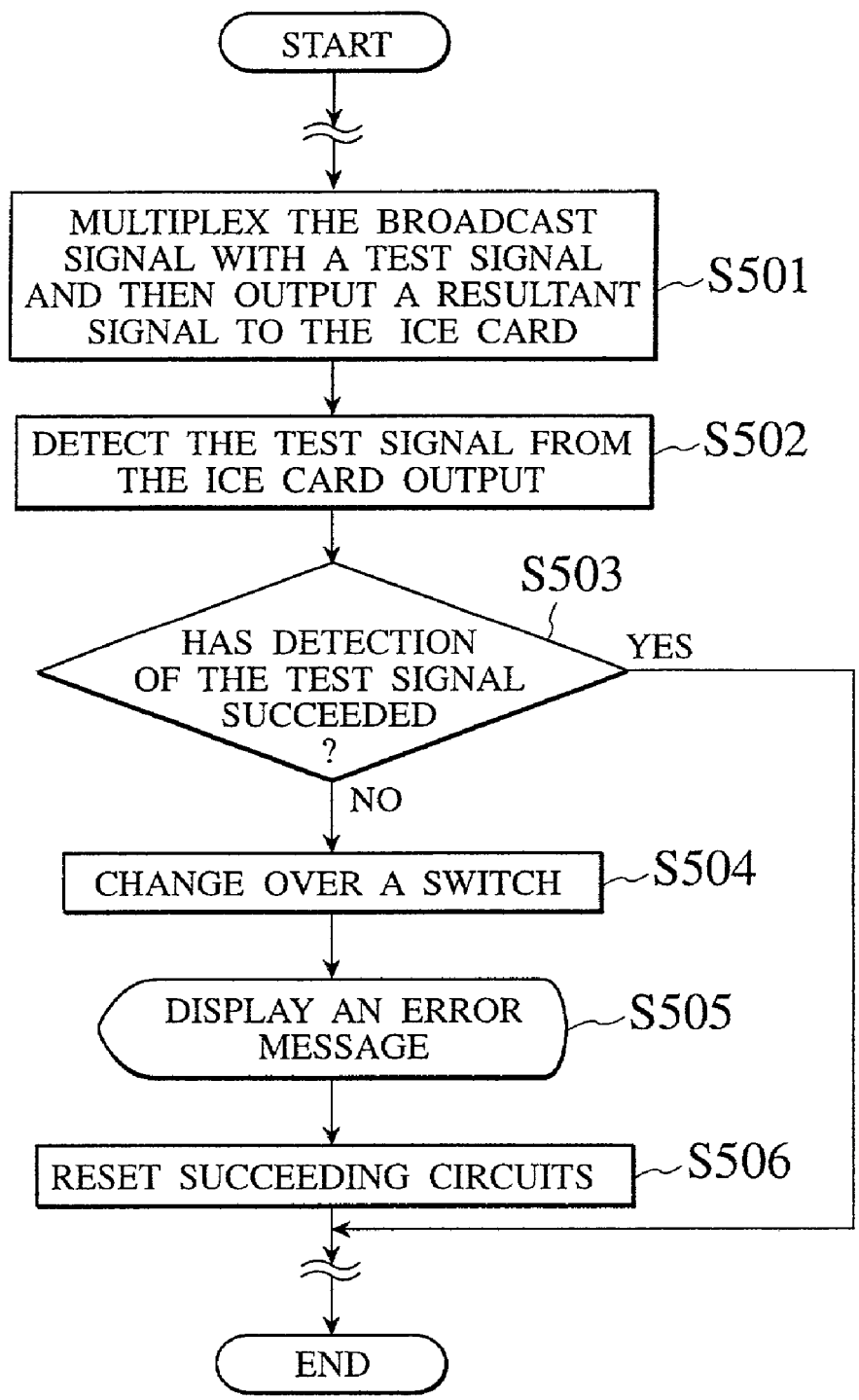
FIG. 17 is a flowchart showing an operation of the digital broadcasting receiver unit according to the fifth embodiment.

Finally, with regard to the card module slots which have been decided as abnormal based on the value R(N) (step S611), like FIG. 17, the card modules are disconnected from the receiver unit main body by operating both the switch via which the broadcasting signal is output to the card module slots and the switch which bypasses the card module slots (step S612), then the abnormal decision contents are displayed on the TV screen by using the on-screen circuit 102 (step S613), and then the circuits succeeding to the defective card modules are reset (step S614).

Figure 19:
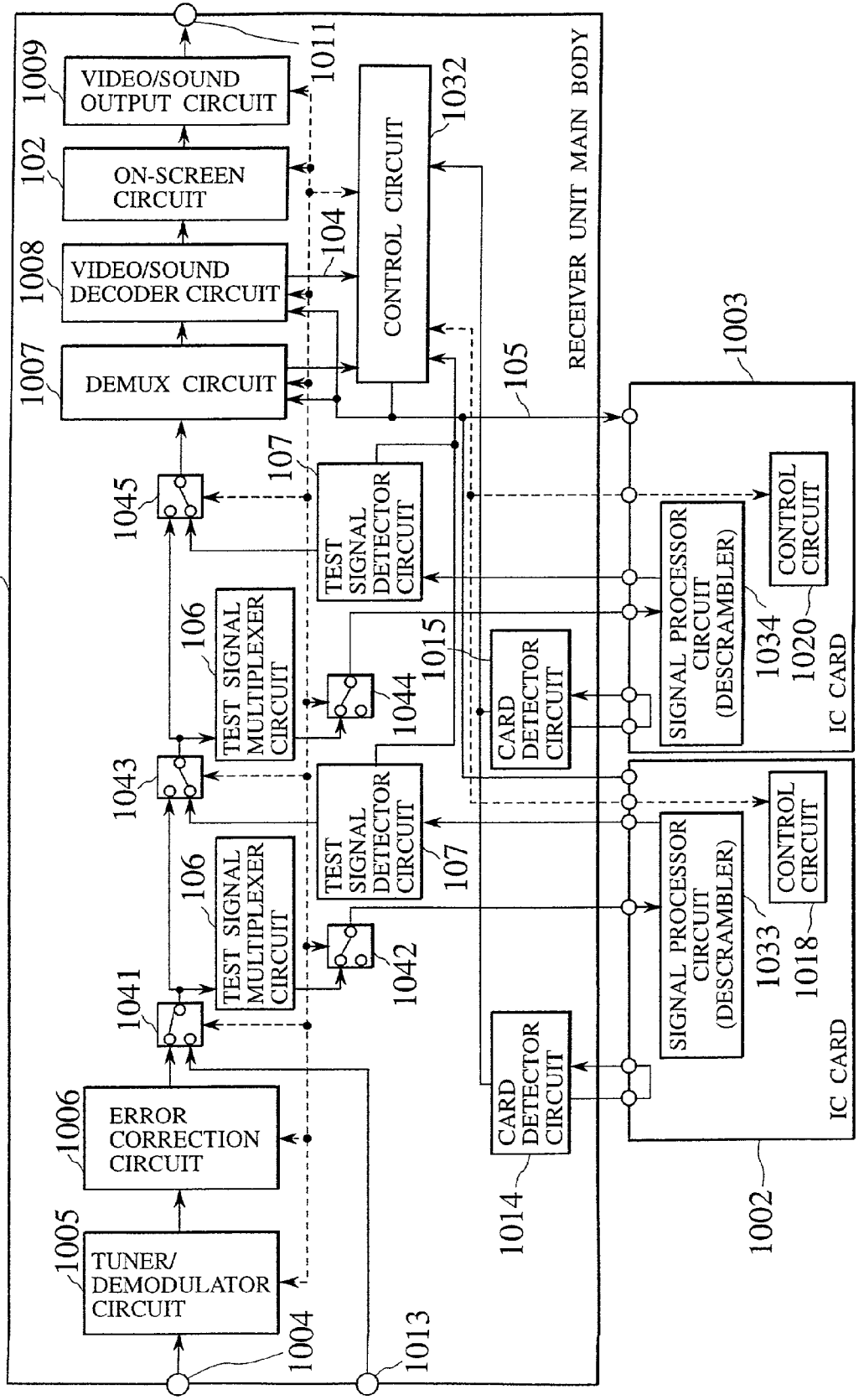
FIG. 19 is a block circuit diagram showing a configuration of a digital broadcasting receiver unit according to a seventh embodiment of the present invention.

FIG. 19 is a block circuit diagram showing a configuration of a digital broadcasting receiver unit according to a seventh embodiment of the present invention.

In FIG. 19, in the receiver unit main body 1001, the test signal multiplexer circuits 106 are provided to the output portions to the card modules and also the test signal detector circuits 107 are provided to the input portions from the card modules. The test signal detector circuits 107 are arranged in the input portions of the switch 1043 and the switch 1045 in the example in FIG. 19, but they may be arranged in the output portions of the switch 1043 and the switch 1045. Then, like the fifth embodiment, the decision process and the switch control process may be applied to the card modules respectively.

According to the seventh embodiment described as above, since the defective of the card modules can be decided by multiplexing the broadcasting signal with the test signal and then the defective card modules can be disconnected from the receiver unit main body, the influence of the failure of some card modules can be limited to the concerned card modules and also the influence of the failure upon the overall receiver system can be prevented.

Further, the user can know the failure contents by displaying detected contents of the failure, so that the user can deal quickly with the failure accident.

Figure 20:
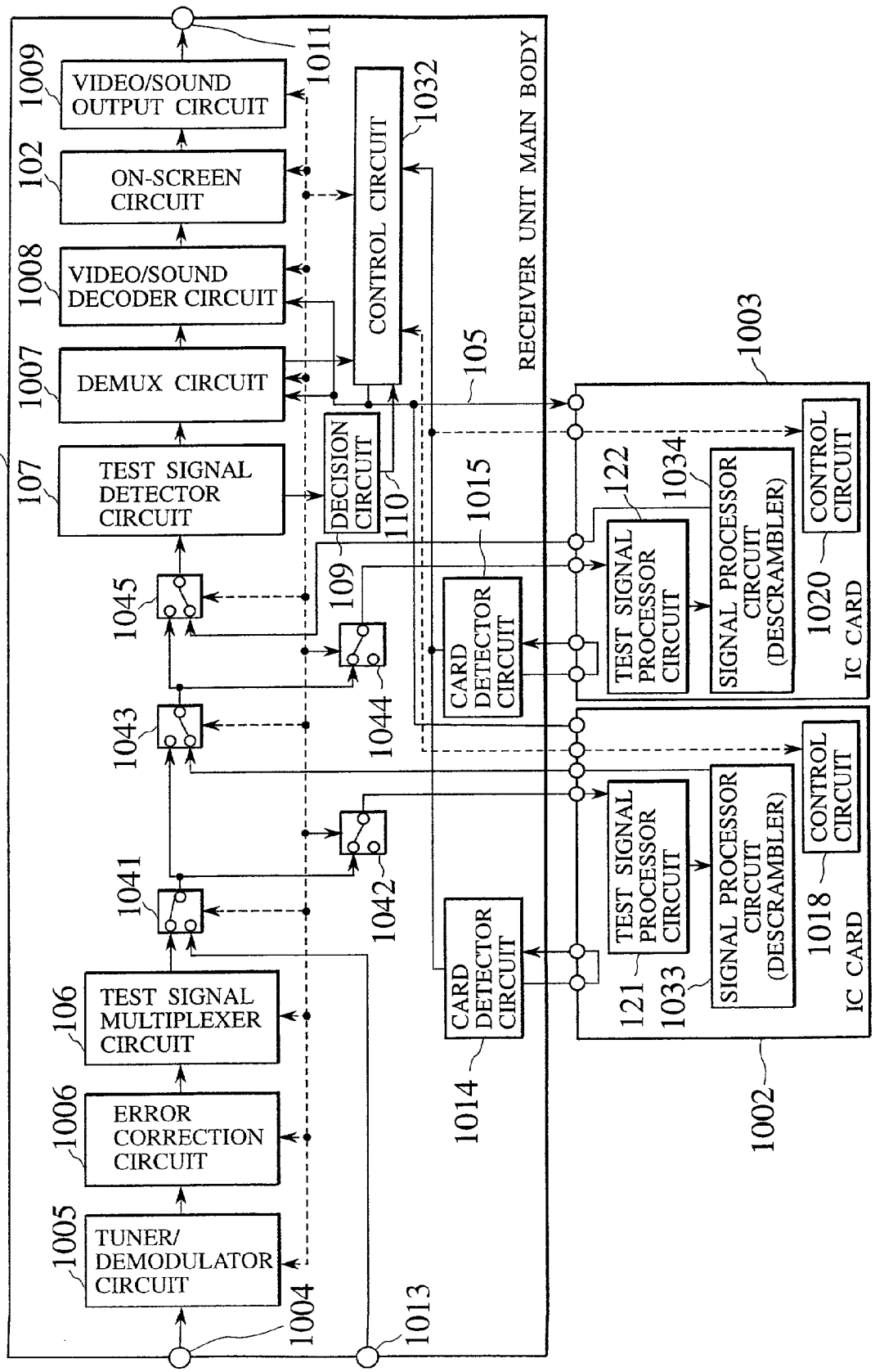
FIG. 20 is a block circuit diagram showing a configuration of a digital broadcasting receiver unit according to an eighth embodiment of the present invention.

FIG. 20 is a block circuit diagram showing a configuration of a digital broadcasting receiver unit according to an eighth embodiment of the present invention.

Differences between the eighth embodiment and the fifth embodiment are that, in the receiver unit main body 1001, a decision circuit 109 which decides whether or not the test signal detected by the test signal detector circuit 107 is normal to then output the decision result to a decision signal 110 is provided, and test signal processor circuits 121, 122 which apply predetermined process to the test signal with which the broadcasting signal is multiplexed are provided to the card modules 1002, 1003 respectively.

The test signal multiplexer circuit 106 multiplexes the broadcasting signal, in which the transmission error has been corrected by the error correction circuit 1006, with the test signal. This test signal may be read from a test signal memory portion (not shown) provided in the test signal multiplexer circuit 106, or may be generated in the test signal multiplexer circuit 106 based on the control by the control circuit 1032. Furthermore, the test signal may be read from the memory portion (not shown) provided in the control circuit 1032 and then supplied to the test signal multiplexer circuit 106. As the test signal, particular constant, random number, etc. may be employed.

Figure 21:
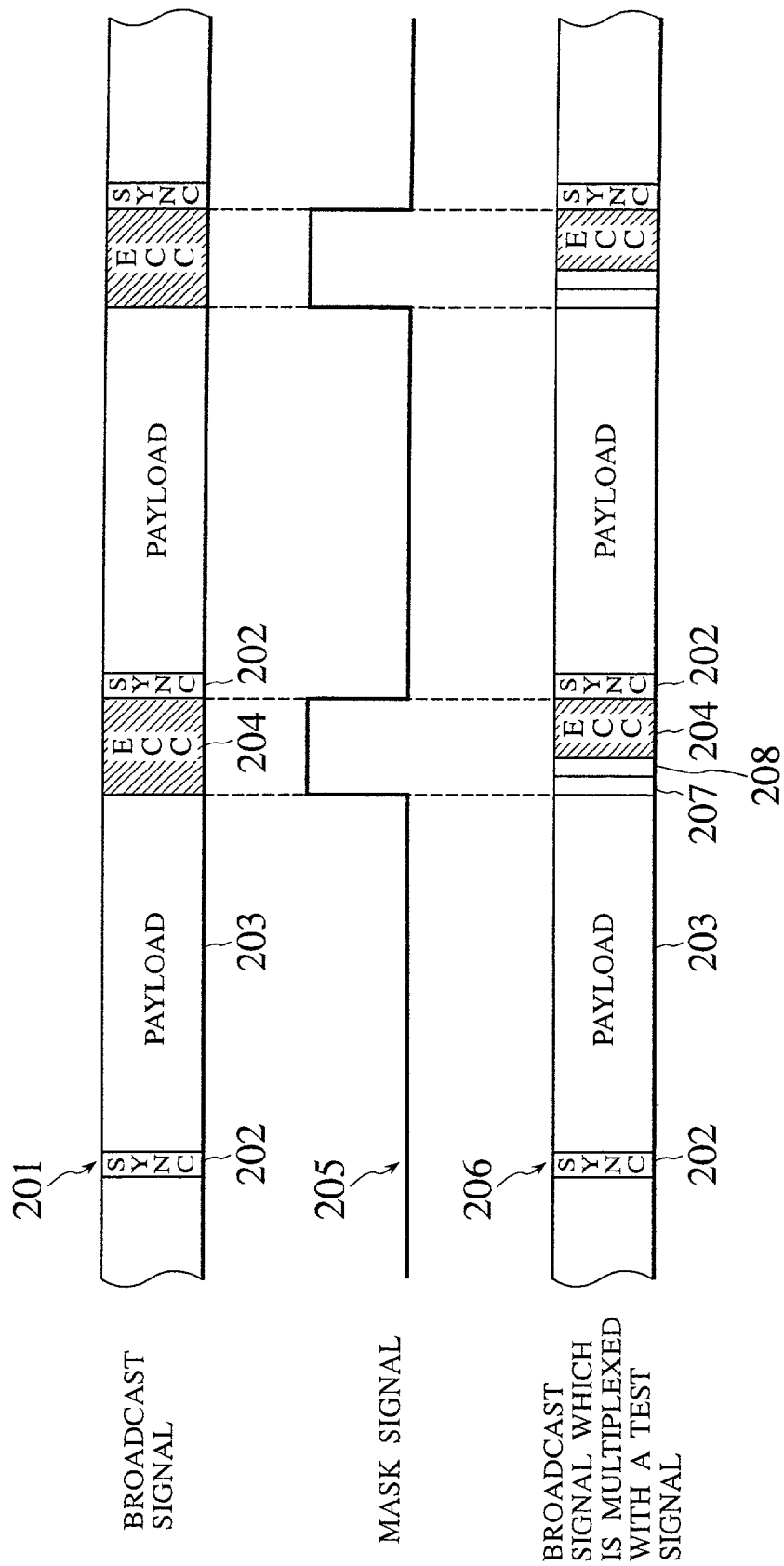
FIG. 21 is an example of signal configurations for explaining test signal insertion positions in the eighth embodiment.

FIG. 21 is a view showing multiplexing procedures of the test signal.

The broadcasting signal 201 in FIG. 21 shows a data format of the ordinary broadcasting signal. The synchronizing signal (SYNC) 202, the payload 203, and the error correcting code (ECC) 204 constitute one packet. A series of packets constitute the broadcasting signal 201.

The error correction circuit 1006 in FIG. 20 executes an error correcting operation based on the payload 203 and the error correcting code 204 to correct errors in the transmission data and then outputs the corrected data to the succeeding circuits. In other words, the portion of the error correcting code 204 in the broadcasting signal 201 becomes invalid after the error correction has been made.

The mask signal 205 in FIG. 21 is a signal showing the invalid portion (H level) of the broadcasting signal 201. The broadcasting signal 201 is multiplexed with the test signal by the test signal multiplexer circuit 106, like the broadcasting signal 206 shown in FIG. 21. The example in FIG. 21 shows the case where the test signal 207 is superposed on the invalid portion.

Like the fifth embodiment, the broadcasting signal 206, which is multiplexed with the test signals 207, 208, and the mask signal 205 are sent out sequentially to the card modules 1002, 1003 via the switches 1041, 1042, 1043, 1044. However, unlike the fifth embodiment, the test signal processor circuits 121, 122 being provided in the card modules 1002, 1003 respectively execute predetermined processes of the test signals 207, 208 buried in the broadcasting signal 206.

The output of the switch 1045 is connected to the input of the test signal detector circuit 107. The test signal detector circuit 107 extracts the portions of the test signal from the broadcasting signal, and then sends out the extracted signal to the decision circuit 109 and also sends out the ordinary broadcasting signal other than the test signal to the DEMUX circuit 1007 at the succeeding stage. The ordinary broadcasting signal is processed ordinarily by the DEMUX circuit 1007 and subsequent circuits.

The decision circuit 109 is a circuit which can decide the normality of the card modules by deciding whether or not the test signal fed from the test signal detector circuit 107 is a correct signal. The decision circuit 109 applies the process, which corresponds to the process performed in the test signal processor circuits 121, 122 in the card modules 1002, 1003, to the detected test signal, then decides the normality of the card modules 1002, 1003 by comparing the processed test signal with, for example, a correct solution value read from a built-in memory or prepared in the inside or a correct solution value given from the control circuit 1032, and then transmits the decision result to the control circuit 1032 as the decision signal 110.

The control circuit 1032, when receives the detection signal 110, disconnects the card modules which are decided to be not normal from the receiver unit main body 1001, and resets the card modules located at the succeeding stage of the defective card module and/or the circuit portions of the receiver unit main body 1001 connected succeedingly to the defective card module by the RESET signal 105.

Figure 28:
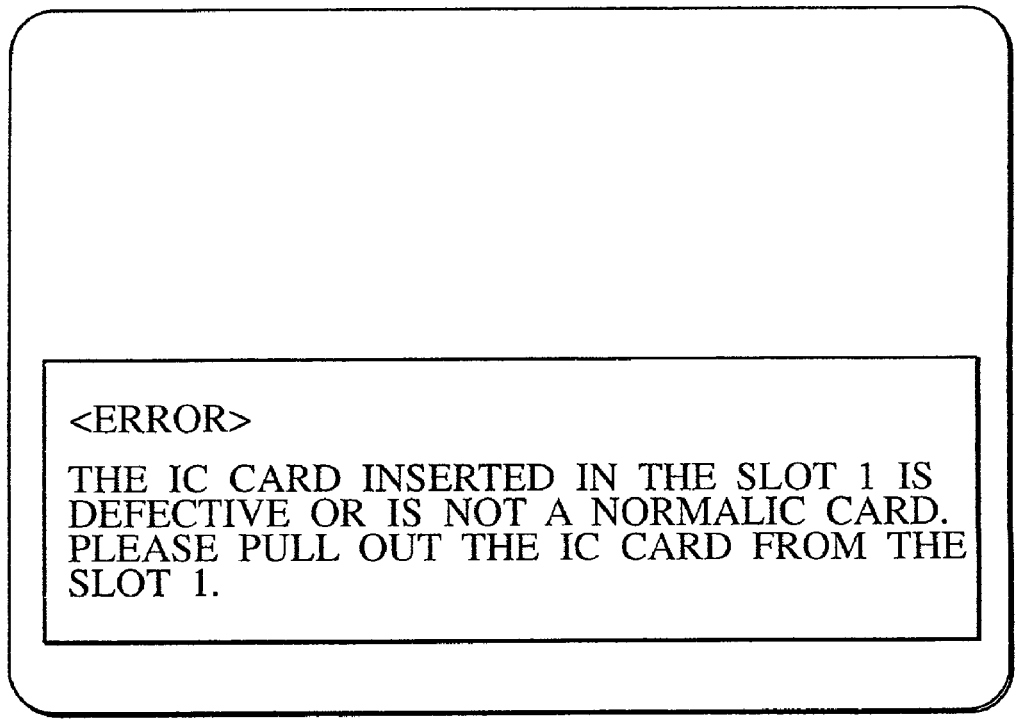
FIG. 28 is an example of a message displayed on a screen when the result of a card module test is not normal.

Also, the control circuit 1032 informs the on-screen circuit 102 of the test result. The on-screen circuit 102 edits a message indicating the contents of the normality test result, as shown in FIG. 28, then superposes the message on the video signal, and then displays them on the TV screen.

In this case, the test signal processor circuit 121 and the signal processor circuit 1033 are arranged in series in this order in the card module 1002, but they may be arranged in series in reverse order. Otherwise, the test signal processor circuit 121 and the signal processor circuit 1033 may be arranged in parallel and then a switch for multiplexing their outputs may be positioned at the succeeding stage of these circuit to return an output of the switch to the receiver unit main body 1001. The same is true of the card module 1003.

The configurations of the test signal processor circuits 121, 122 provided in the card modules 1002, 1003 are not limited particularly if a logic circuit which can apply predetermined processes to the test signal which is superposed on the broadcasting signal and then output the processed test signal are employed. However, it is preferable to employ the logic circuit which has a relatively small amount of hardware and whose internal logic cannot be estimated easily from the test signal being input/output into/from the normal card module. For example, a shift register having a feedback circuit is available.

Figure 22:
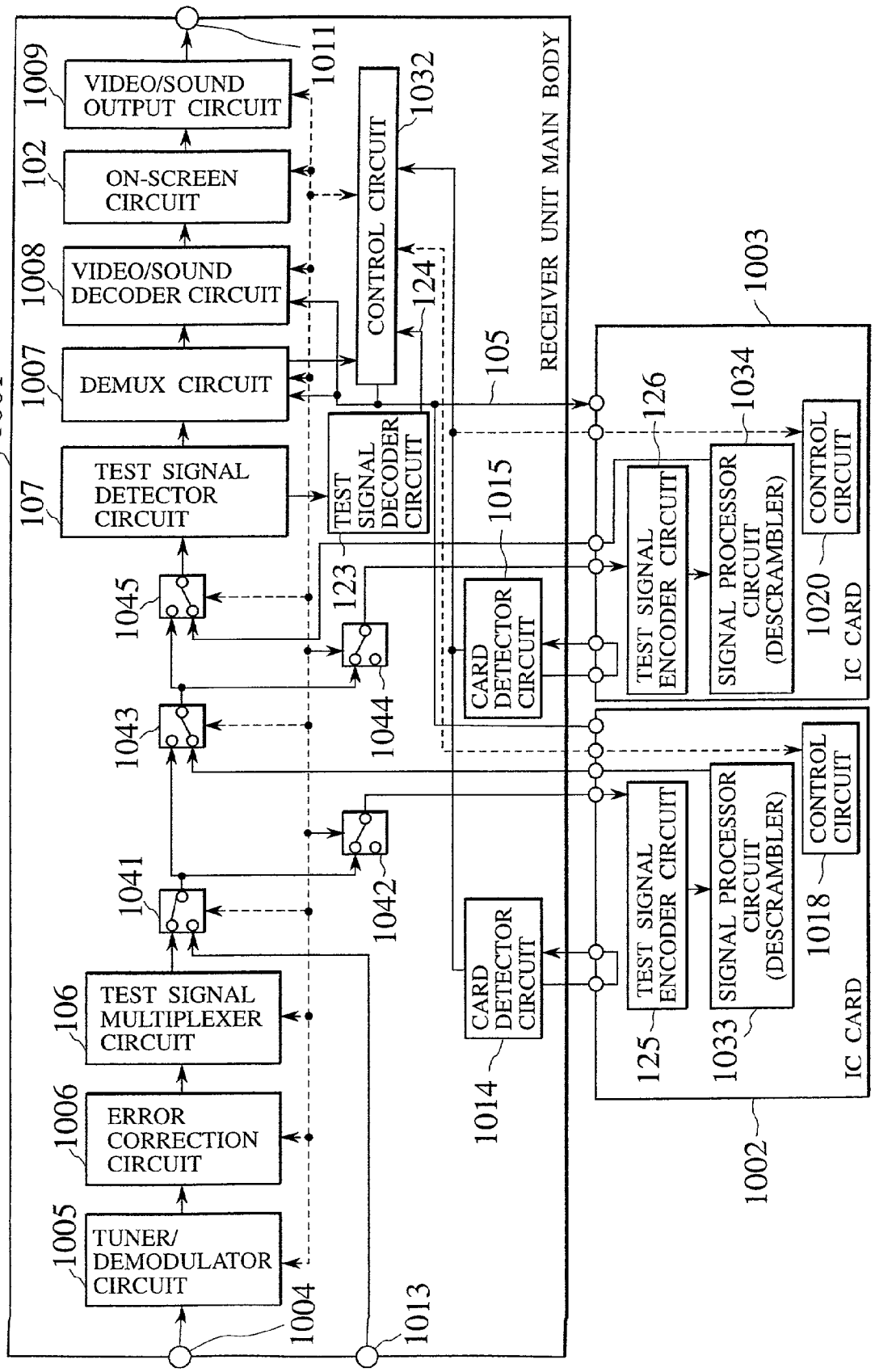
FIG. 22 is a block circuit diagram showing a configuration of a digital broadcasting receiver unit according to a ninth embodiment of the present invention.
Figure 23:
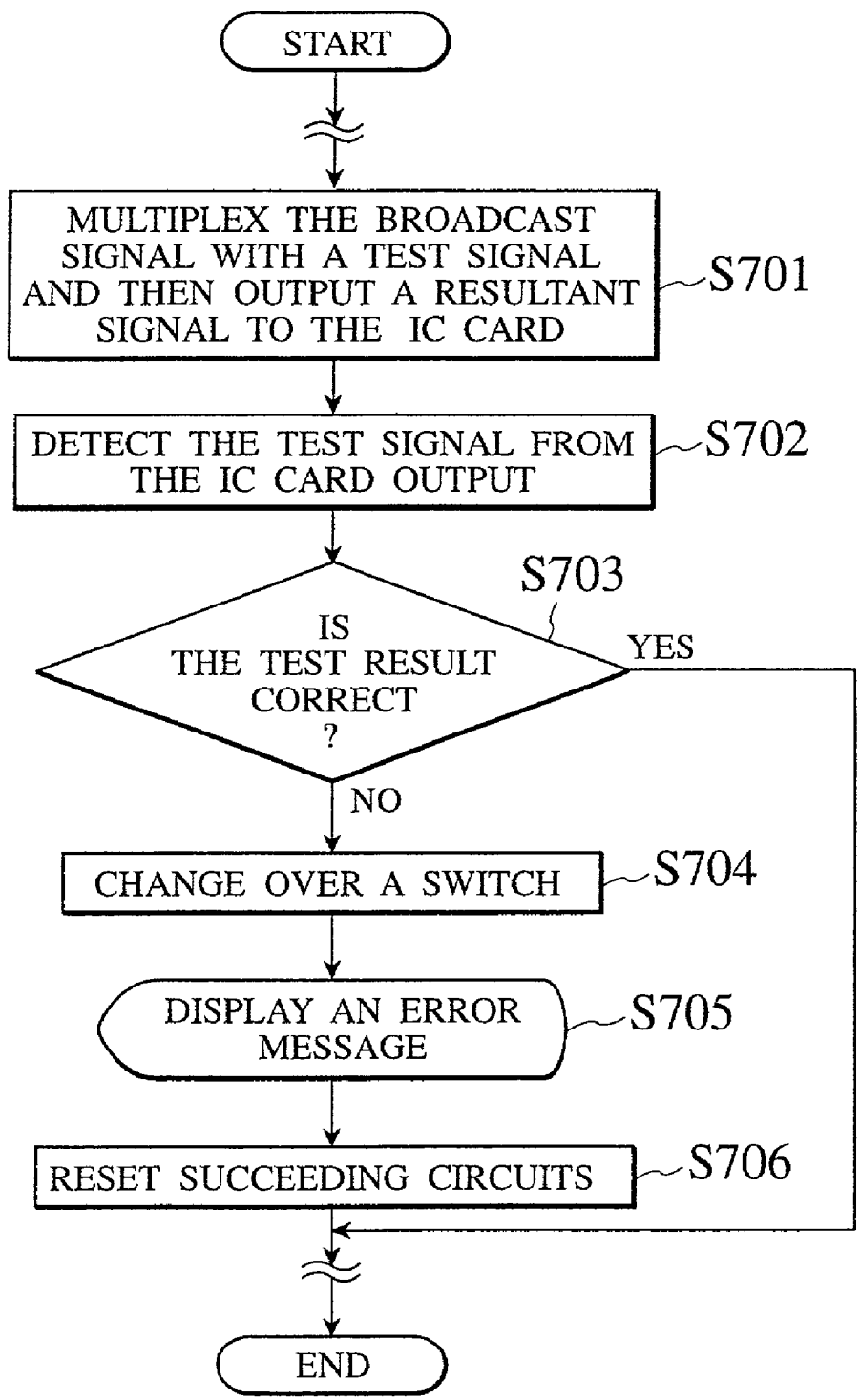
FIG. 23 is a flowchart showing an operation of the digital broadcasting receiver unit according to the ninth embodiment.

Next, a digital broadcasting receiver unit according to a ninth embodiment of the present invention will be explained with reference to FIGS. 21 to 23 hereunder. FIG. 22 is a block circuit diagram showing a configuration of the digital broadcasting receiver unit according to the ninth embodiment of the present invention. FIG. 23 is a flowchart showing an operation of the digital broadcasting receiver unit according to the ninth embodiment.

A difference between the ninth embodiment and the eighth embodiment is that a test signal decoder circuit 123 which decodes the test signal detected by the test signal detector circuit 107 to decide whether or not the test signal is normal, and then outputs a decision signal 124 is provided to the receiver unit main body 1001 in place of the decision circuit 109, and also test signal encoder circuit 125, 126 which encode the test signal being multiplexed with the broadcasting signal are provided to the card modules 1002, 1003 in place of the test signal processor circuit 121, 122 respectively.

Like the eighth embodiment, the broadcasting signal 206, which is multiplexed with the test signals 207, 208, and the mask signal 205 are sent out sequentially to the card modules 1002, 1003 via the switches 1041, 1042, 1043, 1044. However, unlike the eighth embodiment, the test signal encoder circuit 125, 126 being provided in the card modules 1002, 1003 respectively apply the encoding process to the test signals 207, 208 buried in the broadcasting signal 206 by using a predetermined function F respectively. This predetermined function F can be defined arbitrarily, but it must have an inverse function $F^{-1}$ which is used in decoding in the test signal decoder circuit 123.

The output of the switch 1045 is connected to the input of the test signal detector circuit 107. The test signal detector circuit 107 extracts the portions of the test signal from the broadcasting signal, and then sends out the extracted signal to the test signal decoder circuit 123 and also sends out the ordinary broadcasting signal other than the test signal to the DEMUX circuit 1007 located at the succeeding stage. The ordinary broadcasting signal is processed ordinarily by the DEMUX circuit 1007 and subsequent circuits.

The test signal decoder circuit 123 is a circuit which can decide the normality of the card modules by deciding whether or not the test signal fed from the test signal detector circuit 107 is a correct signal. The test signal decoder circuit 123 executes the process of the detected test signal according to the inverse function $F^{-1}$ of the function F in the test signal encoder circuit 125, 126 in the card modules 1002, 1003, then decides the normality of the card modules 1002, 1003 by comparing the processed test signal with, for example, the correct solution value read from the built-in memory or prepared in the inside or the correct solution value given from the control circuit 1032, and then transmits the decision result to the control circuit 1032 as a decision signal 124.

When receives the detection signal 124, the control circuit 1032 disconnects the defective card modules from the receiver unit main body 1001, and resets the card modules located at the succeeding stage of the defective card module and/or the circuit portions of the receiver unit main body 1001 connected succeedingly to the defective card module by the RESET signal 105.

Also, the control circuit 1032 informs the on-screen circuit 102 of the test result. Like the eighth embodiment, the on-screen circuit 102 edits a message indicating the contents of the normality test result, as shown in FIG. 28, then superposes the message on the video signal, and then displays them on the TV screen.

Next, an operation of the digital broadcasting receiver unit according to the ninth embodiment will be explained with reference to a flowchart in FIG. 23 hereunder.

To begin with, the test signal multiplexer circuit 106 multiplexes the broadcast signal with the test signal in the receiver unit main body 1001, and then outputs a resultant signal to the card module (step S701). Then, the test signal detector circuit 107 detects the test signal from the broadcasting signal 206 which is returned from the card module to the receiver unit main body 1001 (step S702). Then, the test signal decoder circuit 123 decodes the test signal to decide whether or not the test signal is the correct solution (step S703). If the detected test signal is the correct solution, the card module is regarded as normal. Then, the process is completed.

If the test signal cannot be detected or it has not been decided that the test signal is the correct solution in step S702, the card module is regarded as abnormal. Then, in step S704, the switch 1041 or the switch 1043 is switched to bypass the card module and the switch 1042 or the switch 1044 is switched to the open side.

As a result, the card module which is regarded as abnormal is disconnected from the receiver unit main body 1001 by these switch operations. Then, in step S705, a message to the effect that the abnormality of the card module is detected, as shown in FIG. 28, is displayed on the screen by the on-screen circuit 102. Although the example using the on-screen circuit 102 has been disclosed in this ninth embodiment, the lamp display such as LED provided on a front panel (not shown) of the receiver unit main body 1001, etc. may also be adopted. Then, in step S706, the control circuit 1032 outputs the RESET signal 105 so as to reset the succeeding circuits such as the DEMUX circuit 1007, the video/sound decoder circuit 1008, etc. or the card module.

Figure 24:
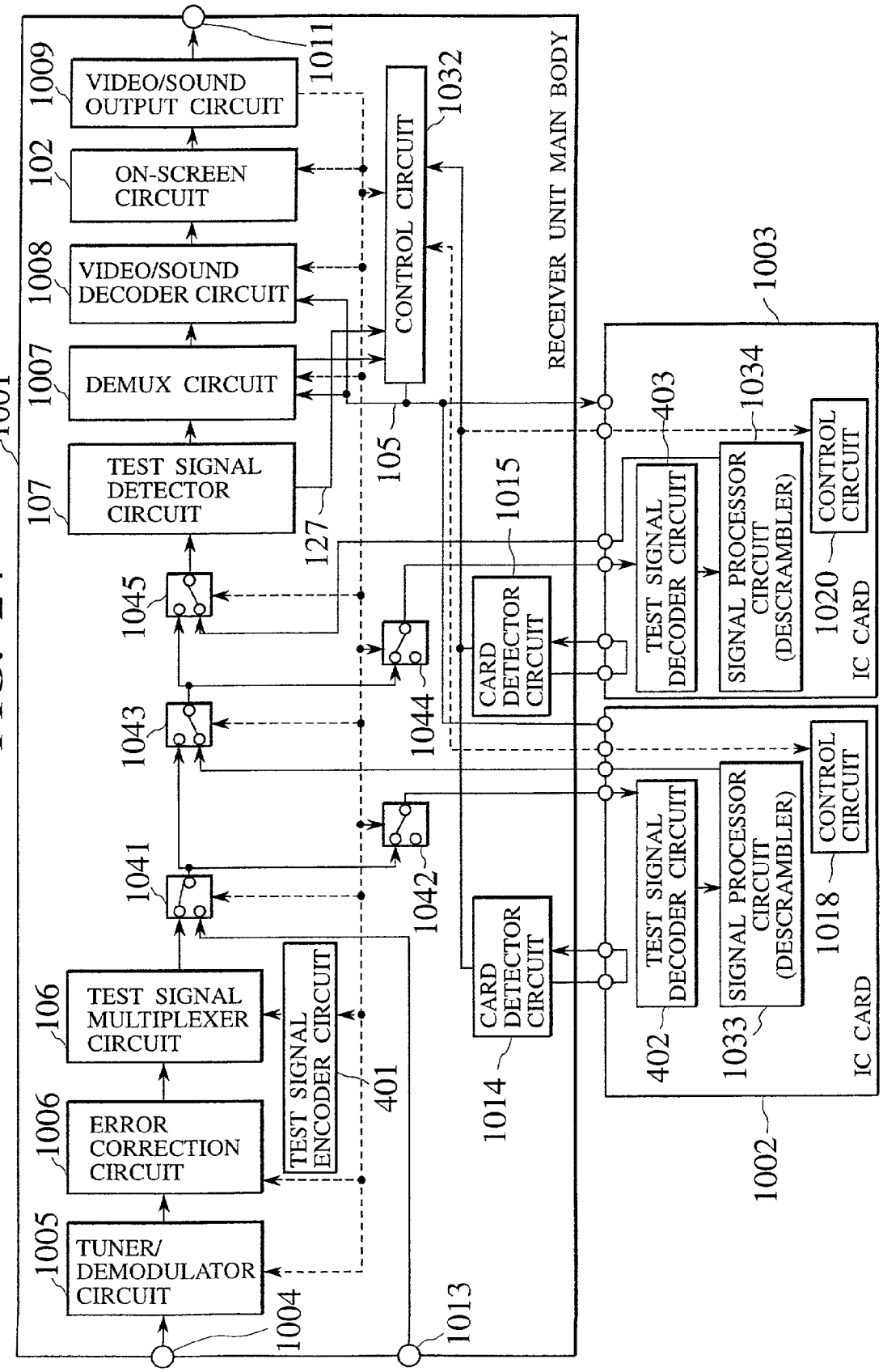
FIG. 24 is a block circuit diagram showing a configuration of a digital broadcasting receiver unit according to a tenth embodiment of the present invention.

FIG. 24 is a block circuit diagram showing a configuration of a digital broadcasting receiver unit according to a tenth embodiment of the present invention.

A difference between the tenth embodiment and the ninth embodiment are given in the following. In the ninth embodiment, the test signal which is superposed on the broadcasting signal in the receiver unit main body is encoded once in the card modules, then the test signal detector circuit in the receiver unit main body detects the test signal from the signal which is returned again to the receiver unit main body from the card modules, and then the decoder circuit decodes the detected test signal to decide the result.

On the contrary, in the tenth embodiment, the test signal encoder circuit 401 is provided on the receiver unit main body 1001 side, and then the broadcasting signal is multiplexed with the test signal, which is encoded by the test signal encoder circuit 401, by the test signal multiplexer circuit 106. Then, the receiver unit main body 1001 outputs the broadcasting signal which is multiplexed with the test signal to the card modules 1002, 1003. The card modules 1002, 1003 include the test signal decoder circuits 402, 403 which decode the encoded test signal which is superposed on the broadcasting signal respectively. The decoded test signal as well as the broadcasting signal is returned to the receiver unit main body 1001, and then the test signal detector circuit 107 detects the test signal to execute the decision.

In short, the difference between the tenth embodiment and the ninth embodiment resides in that the card modules encode the test signal and the receiver unit main body decodes the encoded test signal in the ninth embodiment, whereas the receiver unit main body encodes the test signal and the card modules decode the encoded test signal in the tenth embodiment.

Figure 25:
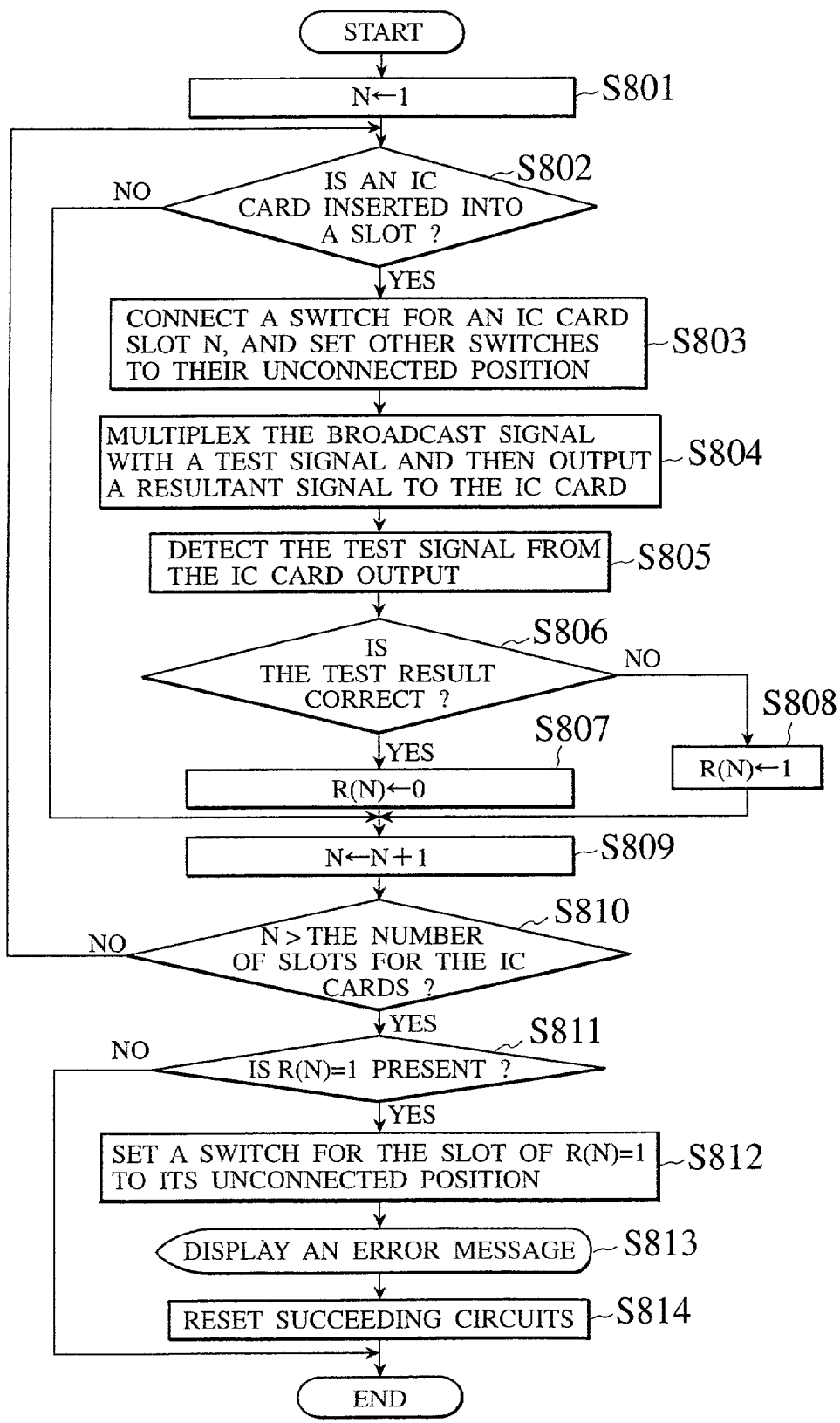
FIG. 25 is a flowchart showing an operation of a digital broadcasting receiver unit according to eleventh and twelfth embodiments of the present invention.

Next, a digital broadcasting receiver unit according to eleventh and twelfth embodiments of the present invention will be explained with reference to FIGS. 22, 24, and 25 hereunder.

In the eleventh embodiment, the configuration of the digital broadcasting receiver unit is substantially similar to that of the ninth embodiment shown in FIG. 22. But the number N of the card module slots, and sequential connection control of the card modules by the control circuit 1032 and disconnection control of the defective card modules from the receiver unit main body are different from the ninth embodiment.

In the twelfth embodiment, the configuration of the digital broadcasting receiver unit is substantially similar to that of the tenth embodiment shown in FIG. 24. But the number N of the card module slots, and sequential connection control of the card modules by the control circuit 1032 and disconnection control of the defective card modules from the receiver unit main body are different from the tenth embodiment.

Then, a control flow of the common receiver unit main body according to the eleventh and twelfth embodiments will be explained with reference to FIG. 25 hereunder.

First, in step S801, a variable N is initialized to "1". The variable N is a variable showing the slot number for a card module, and thus the slots for the card module are numbered from 1 to the maximum slot number (e.g., 8). In step S802, it is detected by the card detector circuits 1014, 1015, . . . which correspond to individual card modules, whether or not the card modules are inserted into the slots of the receiver unit main body 1001. Unless the card modules are inserted, the normality deciding processes using the test signal are skipped.

If any card module is inserted into the slots, the normality deciding processes using the test signal are carried out. In step S803, the switch corresponding to the slot N for the card module is set to the connection position, and other switches are set to their unconnected position. For example, in the case that the card module 1002 is inserted to decide the normality thereof, the switch 1042 is set to the connection side, the switch 1043 is set to the card module output side, the switch 1044 is set to the open side, and the switch 1045 is set to the card module bypass side. The switches which switch the bypassing signals bypassing other card modules and the output signals of other card modules are set to the bypass signal side. Thus, the switches are connected to pass the test signal through the card module 1002 only, and thus only the normality of the card module 1002 can be decided singly.

In steps S804 to S806, each card module is processed in the same way as the decision processes (steps S701 to S703) in FIG. 23. In the eleventh embodiment, the card modules encode the test signal and the receiver unit main body decodes the encoded test signal. In contrast, in the twelfth embodiment, the receiver unit main body encodes the test signal and the card modules decode the encoded test signal.

In either embodiment, a result flag R(N) is set to "0" in step S807 if the card module as the test object is decided to be normal, whereas the result flag R(N) is set to "1" in step S808 if the card module is decided to be abnormal.

Then, in step S809, a value 1 is added to N to decide the next card module. Then, in step S810, it is decided whether or not N exceeds the number of slots for the card modules. If N exceeds the number of slots for the card modules, a series of decision processes are ended. In contrast, if N is less than the number of slots for the card modules, the normality of the next card module is similarly decided.

Finally, with regard to the card module slots have been decided as abnormal based on the value R(N) (step S811), like FIG. 23, the card module(s) is(are) disconnected from the receiver unit main body by operating both the switch via which the broadcasting signal is output to the card module slots and the switch which bypasses the card module slots (step S812), then the abnormal decision contents are displayed on the TV screen by using the on-screen circuit 102 (step S813), and then the circuits succeeding to the defective card modules are reset (step S814).

Figure 26:
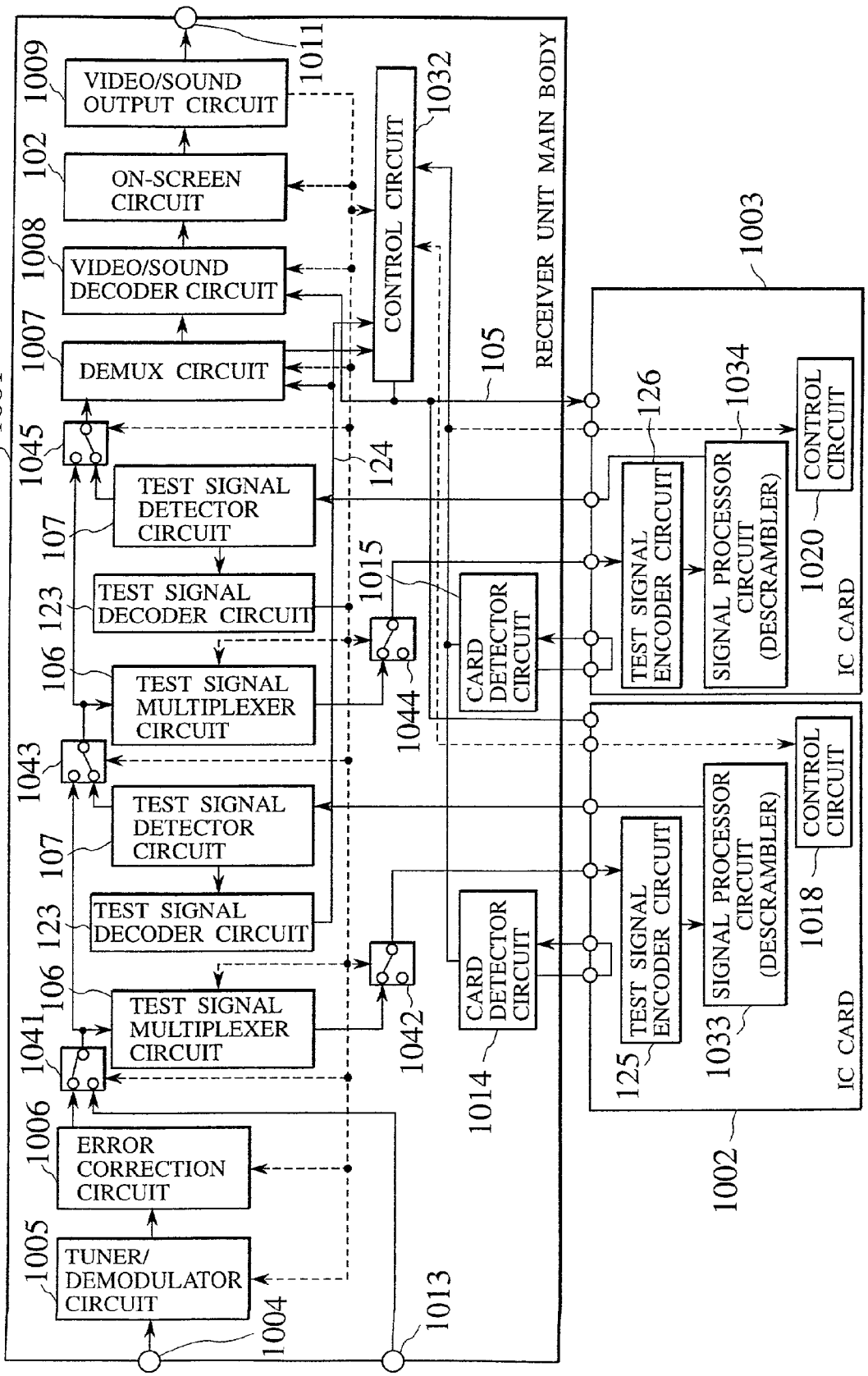
FIG. 26 is a block circuit diagram showing a configuration of a digital broadcasting receiver unit according to a thirteenth embodiment of the present invention.

FIG. 26 is a block circuit diagram showing a configuration of a digital broadcasting receiver unit according to a thirteenth embodiment of the present invention. The thirteenth embodiment is different from the ninth embodiment in that there are provided a plurality of test signal multiplexer circuits 106 which multiplex the broadcasting signal with the test signal at output portions of the receiver unit main body to a plurality of card modules respectively, and a plurality of test signal detector circuits 107 and a plurality of test signal decoder circuits 123 which detect the test signal from the broadcasting signal being output from a plurality of card modules at input portions of the receiver unit main body and decode it respectively.

More particularly, as shown in FIG. 26, in the thirteenth embodiment, the test signal multiplexer circuits 106 are provided to the output portions of the receiver unit main body 1001 to the card modules, and the test signal detector circuits 107 and the test signal decoder circuits 123 are provided to the input portions of the receiver unit main body 1001 from the card modules. The test signal detector circuits 107 are arranged to input portions of the switch 1043 and the switch 1045 in the example in FIG. 26, they may be arranged to output portions of the switch 1043 and the switch 1045.

Like the ninth embodiment, the decision process and the control process of the switches are applied to respective card modules 1002, 1003.

Next, a digital broadcasting receiver unit according to a fourteenth embodiment of the present invention will be explained with reference to FIG. 27 hereunder.

The fourteenth embodiment is different from the tenth embodiment in that there are provided a plurality of test signal encoder circuits 401 which encode the test signal to correspond to a plurality of card modules respectively, a plurality of test signal multiplexer circuits 106 which multiplex the broadcasting signal with the test signal being encoded by the test signal encoder circuits 401 respectively, and a plurality of test signal detector circuits 107 which detect the test signal from the broadcasting signal being output from a plurality of card modules respectively at input portions of the receiver unit main body 1001.

Figure 27:
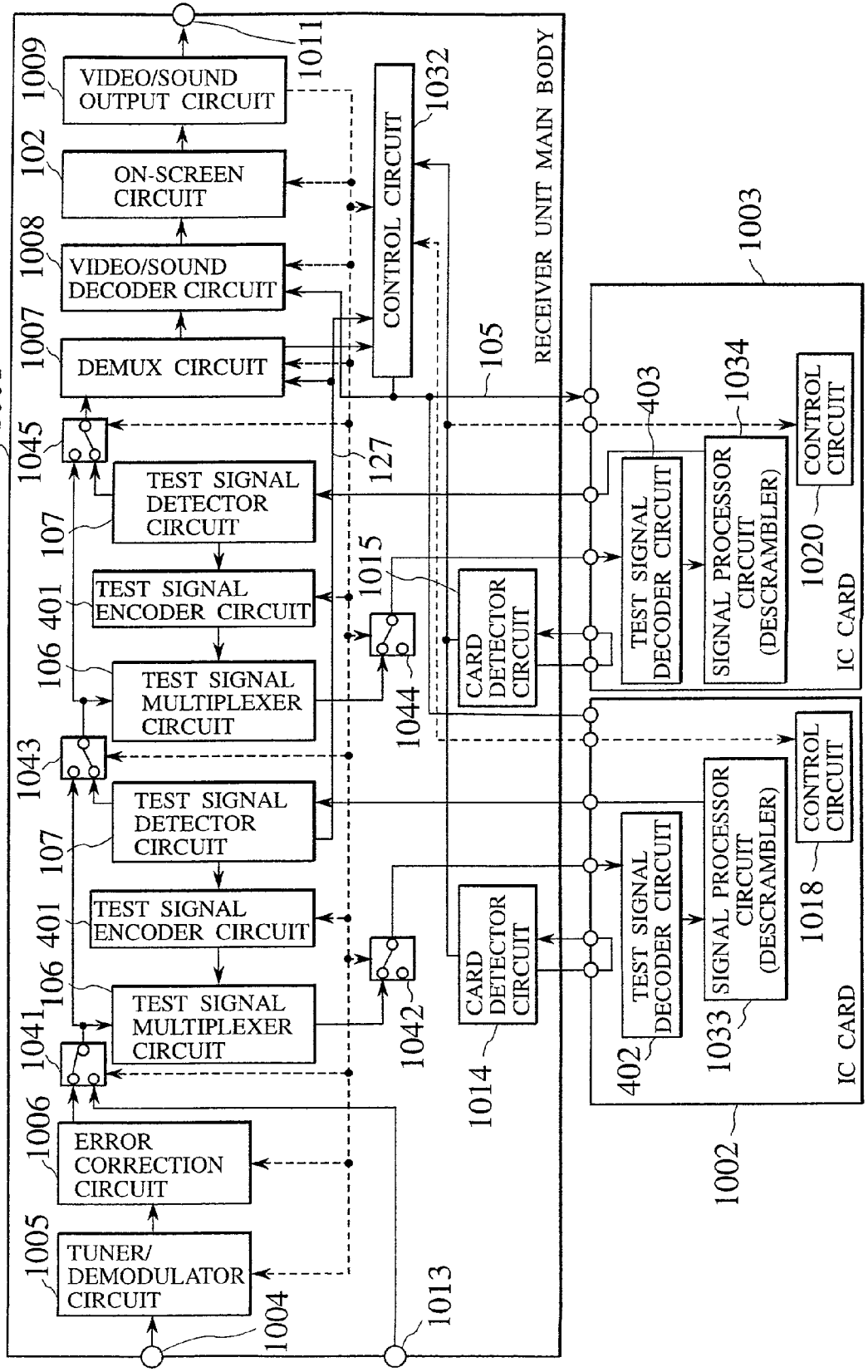
FIG. 27 is a block circuit diagram showing a configuration of a digital broadcasting receiver unit according to a fourteenth embodiment of the present invention.

More particularly, as shown in FIG. 27, in the fourteenth embodiment, the test signal multiplexer circuits 106 and the test signal encoder circuits 401 are provided to the output portions of the receiver unit main body 1001 to the card modules, and the test signal detector circuits 107 are provided to the input portions of the receiver unit main body 1001 from the card modules. The test signal detector circuits 107 are arranged to the input portions of the switch 1043 and the switch 1045 in the example in FIG. 27, they may be arranged to the output portions of the switch 1043 and the switch 1045. Like the tenth embodiment, the decision process and the control process of the switches are applied to respective card modules 1002, 1003.

According to the fourteenth embodiment described above, the normality of the card modules can be decided by multiplexing the broadcasting signal with the test signal at the output portions of the receiver unit main body to the card modules, then generating the processed test signal by applying the predetermined process to the test signal which is superposed on the broadcasting signal in the card modules, and then detecting the test signal from the broadcasting signal being returned again to the receiver unit main body. As a result, the card modules, which are illegally connected such that the predetermined process cannot be applied to the test signal, and the defective card modules can be detected.

Accordingly, there is such an advantage that, since the illegal card modules or the defective card modules can be disconnected from the broadcasting receiver unit main body by switching the signal via the switches such that the illegally connected card modules or the defective card modules are bypassed, the unfair practice or the large influence upon the overall receiver system can be prevented.

In addition, the user can know the contents by displaying the test result, and thus the user can deal quickly with the unfair practice or the failure. The preferable embodiments have been explained as above, but these should be interpreted not to limit the present invention. It is apparent that the present invention can be applied to the normal digital information receiver unit which receives digital information supplied by the communication via wired/radio communication other than the digital broadcasting and decodes them.

INDUSTRIAL APPLICABILITY

According to the present invention, even in the case that the card modules are connected to any slots, the attributes of the card modules can be checked on the receiver unit main body side, and thus the connection order of the card modules can be changed to fit for the digital broadcasting receiving process.

Also, operations needed upon connecting the card modules to the receiver unit main body can be facilitated.

In addition, in the digital broadcasting receiver unit which comprises the receiver unit main body having a plurality of slots and a plurality of card modules which can be attached/detached to/from the slots, the connection order of the card modules connected to respective slots in the daisy-chain connection can be optimized even if the card modules are inserted into any slots.

Further, it is decided whether or not the card modules which are connected to the receiver unit main body can function normally, and then the large influence upon the overall receiver unit can be prevented by disconnecting functionally the defective card modules from the receiver unit main body.

Furthermore, the illegal card modules can be functionally disconnected from the broadcasting receiver unit main body by detecting the card modules which are illegally connected to the receiver unit main body and then switching the signal via the switches such that the illegally connected card modules are bypassed. As a result, the unfair practice can be prevented and also the large influence upon the overall receiver unit can be prevented.

What is claimed is:

1. A digital information receiving system including a first unit for receiving and outputting digital information, and a plurality of second units, which are able to be attached to and detached from the first unit to form a daisy-chain connection via the first unit, for receiving the digital information via the daisy-chain connection, applying processing to the digital information, and sending back processed digital information to the first unit, the system comprising:

a plurality of switching means, each provided to a corresponding one of the second units, for switching so as to incorporate the corresponding second unit into the daisy-chain connection or disconnect the corresponding second unit from the daisy-chain connection;

an abnormality detecting deciding means for detecting and deciding abnormality of the plurality of second units; and a controlling means for controlling a switching means corresponding to a second unit which is detected and decided to be abnormal so as to disconnect the second unit from the daisy-chain connection, based on a signal from the abnormality detecting deciding means, wherein the abnormality detecting deciding means includes:

a test signal multiplexing means for multiplexing the digital information with the test signal before the digital information are passed through the plurality of second units, and a test signal detecting means for detecting the test signal from the digital information which are passed through the plurality of second units via the daisy-chain connection to decide whether or not the detected test signal is normal.

2. A digital information receiving system according to claim 1, wherein the controlling means controls the plurality of switching means so as to connect the plurality of second units to the first unit one by one, and the abnormality detecting deciding means detects and decides the abnormality of the plurality of the second units one by one.

3. A digital information receiving system according to claim 1, wherein the test signal multiplexing means multiplexes an invalid portion in each packet of the digital information with the test signal.

4. A digital information receiving system including a first unit for receiving and outputting digital information, and a plurality of second units, which are able to be attached to and detached from the first unit to form a daisy-chain connection via the first unit, for receiving the digital information via the daisy-chain connection, applying processing to the digital information, and sending back processed digital information to the first unit, the system comprising:

a plurality of switching means, each provided to a corresponding one of the second units, for switching so as to incorporate the corresponding second unit into the daisy-chain connection or disconnect the corresponding second unit from the daisy-chain connection:

an abnormality detecting deciding means for detecting and deciding abnormality of the plurality of second units; and a controlling means for controlling a switching means corresponding to a second unit which is detected and decided to be abnormal so as to disconnect the second unit from the daisy-chain connection, based on a signal from the abnormality detecting deciding means, wherein the abnormality detecting deciding means includes:

a test signal multiplexing means for multiplexing the digital information with the test signal before the digital information are passed through the plurality of second units, a plurality of test signal processing means, provided to the plurality of second units respectively, for applying a predetermined process to the test signal with which input digital information is multiplexed, outputting the processed test signal, a test signal detecting means for detecting the test signal from the digital information which are passed through the plurality of second units via the daisy-chain connection, and a deciding means for applying process corresponding to the predetermined process to the test signal detected by the test signal detecting means to decide whether or not the test signal is normal.

5. A digital information receiving system according to claim 4, wherein the controlling means controls the plurality of switching means so as to connect the plurality of second units to the first unit one by one, and the abnormality detecting deciding means detects and decides the abnormality of the plurality of the second units one by one.

6. A digital information receiving system including a first unit for receiving and outputting digital information, and a plurality of second units, which are able to be attached to and detached from the first unit to form a daisy-chain connection via the first unit, for receiving the digital information via the daisy-chain connection, applying peculiar processing to the digital information, and sending back processed digital information to the first unit, the system comprising:

a plurality of switching means, each provided to a corresponding one of the second units, for switching so as to incorporate the corresponding second unit into the daisy-chain connection or disconnect the corresponding second unit from the daisy-chain connection;

an abnormality detecting deciding means for detecting and deciding abnormality of the plurality of second units; and a controlling means for controlling a switching means corresponding to a second unit which is detected and decided to be abnormal so as to disconnect the second unit from the daisy-chain connection, based on a signal from the abnormality detecting deciding means, wherein the abnormality detecting deciding means includes:

a test signal multiplexing means for multiplexing the digital information with the test signal before the digital information are passed through the plurality of second units, a plurality of test signal encoding means, provided to the plurality of second units respectively, for encoding the test signal with which input digital information is multiplexed, outputting the encoded test signal, a test signal detecting means for detecting the test signal from the digital information which are passed through the plurality of second units via the daisy-chain connection, and a test signal decoding means for decoding the test signal detected by the test signal detecting means and then deciding whether or not the decoded test signal is normal.

7. A digital information receiving system according to claim 6, wherein the controlling means controls the plurality of switching means so as to connect the plurality of second units to the first unit one by one, and the abnormality detecting deciding means detects and decides the abnormality of the plurality of the second units one by one.

8. A digital information receiving system including a first unit for receiving and outputting digital information, and a plurality of second units, which are able to be attached to and detached from the first unit to form a daisy-chain connection via the first unit, for receiving the digital information via the daisy-chain connection, applying peculiar processing to the digital information, and sending back processed digital information to the first unit, the system comprising:

a plurality of switching means, each provided to a corresponding one of the second units, for switching so as to incorporate the corresponding second unit into the daisy-chain connection or disconnect the corresponding second unit from the daisy-chain connection;

an abnormality detecting deciding means for detecting and deciding abnormality of the plurality of second units; and a controlling means for controlling a switching means corresponding to a second unit which is detected and decided to be abnormal so as to disconnect the second unit from the daisy-chain connection, based on a signal from the abnormality detecting deciding means, wherein the abnormality detecting deciding means includes:

a test signal encoding means for encoding the test signal, a test signal multiplexing means for multiplexing the digital information with the encoded test signal before the digital information are passed through the plurality of second units, a plurality of test signal decoding means, provided to the plurality of second units respectively, for decoding the test signal with which input digital information is multiplexed, outputting the decoded test signal, and a test signal detecting means for detecting the test signal from the digital information which are passed through the plurality of second units via the daisy-chain connection to decide whether or not the detected test signal is normal.

9. A digital information receiving system according to claim 8, wherein the controlling means controls the plurality of switching means so as to connect the plurality of second units to the first unit one by one, and the abnormality detecting deciding means detects and decides the abnormality of the plurality of the second units one by one.

10. A digital information receiving system including a first unit for receiving and outputting digital information, and a plurality of second units, which are able to be attached to and detached from the first unit to form a daisy-chain connection via the first unit, for receiving the digital information via the daisy-chain connection, applying processing to the digital information, and sending back processed digital information to the first unit, the system comprising:
  a plurality of switching means, each provided to a corresponding one of the second units, for switching so as to incorporate the corresponding second unit into the daisy-chain connection or disconnect the corresponding second unit from the daisy-chain connection;
  an abnormality detecting deciding means for detecting and deciding abnormality of the plurality of second units, wherein the abnormality detecting deciding means includes a plurality of corresponding abnormality detecting and deciding means, provided to correspond to the plurality of second units, respectively, for detecting and deciding the abnormality of the plurality of the second units respectively; and
  a controlling means for controlling a switching means corresponding to a second unit which is detected and decided to be abnormal so as to disconnect the second unit from the daisy-chain connection, based on a signal from the abnormality detecting deciding means,
  wherein each of the plurality of corresponding abnormality detecting deciding means includes:
    a test signal multiplexing means for multiplexing the digital information to be received by the corresponding second unit with the test signal,
    a test signal processing means, provided to the corresponding second unit, for applying a predetermined process to the test signal with which input digital information is multiplexed, outputting the processed test signal,
    a test signal detecting means for detecting the test signal from the digital information being output from the corresponding second unit, and
    a deciding means for applying process corresponding to the predetermined process to the test signal detected by the test signal detecting means to decide whether or not the test signal is normal.

11. A digital information receiving system including a first unit for receiving and outputting digital information, and a plurality of second units, which are able to be attached to and detached from the first unit to form a daisy-chain connection via the first unit, for receiving the digital information via the daisy-chain connection, applying processing to the digital information, and sending back processed digital information to the first unit, the system comprising:
  a plurality of switching means, each provided to a corresponding one of the second units, for switching so as to incorporate the corresponding second unit into the daisy-chain connection or disconnect the corresponding second unit from the daisy-chain connection;
  an abnormality detecting deciding means for detecting and deciding abnormality of the plurality of second units, wherein the abnormality detecting deciding means includes a plurality of corresponding abnormality detecting and deciding means, provided to correspond to the plurality of second units, respectively, for detecting and deciding the abnormality of the plurality of the second units respectively; and
  a controlling means for controlling a switching means corresponding to a second unit which is detected and decided to be abnormal so as to disconnect the second unit from the daisy-chain connection, based on a signal from the abnormality detecting deciding means,
  wherein each of the plurality of corresponding abnormality detecting deciding means includes:
    a test signal multiplexing means for multiplexing the digital information to be received by the corresponding second unit with the test signal,
    a test signal encoding means, provided to the corresponding second unit, for encoding the test signal with which input digital information is multiplexed, outputting the encoded test signal,
    a test signal detecting means for detecting the test signal from the digital information being output from the corresponding second unit, and
    a test signal decoding means for decoding the test signal detected by the test signal detecting means and then deciding whether or not the decoded test signal is normal.

12. A digital information receiving system including a first unit for receiving and outputting digital information, and a plurality of second units, which are able to be attached to and detached from the first unit to form a daisy-chain connection via the first unit, for receiving the digital information via the daisy-chain connection, applying processing to the digital information, and sending back processed digital information to the first unit, the system comprising:
  a plurality of switching means, each provided to a corresponding one of the second units, for switching so as to incorporate the corresponding second unit into the daisy-chain connection or disconnect the corresponding second unit from the daisy-chain connection;
  an abnormality detecting deciding means for detecting and deciding abnormality of the plurality of second units, wherein the abnormality detecting deciding means includes a plurality of corresponding abnormality detecting and deciding means, provided to correspond to the plurality of second units, respectively, for detecting and deciding the abnormality of the plurality of the second units respectively; and
  a controlling means for controlling a switching means corresponding to a second unit which is detected and decided to be abnormal so as to disconnect the second unit from the daisy-chain connection, based on a signal from the abnormality detecting deciding means,
  wherein each of the plurality of corresponding abnormality detecting deciding means includes:
    a test signal encoding means for encoding the test signal,
    a test signal multiplexing means for multiplexing the digital information to be received by the corresponding second unit with the encoded test signal,
    a test signal decoding means, provided to the corresponding second unit, for decoding the test signal with which input digital information is multiplexed, outputting the decoded test signal, and
    a test signal detecting means for detecting the test signal from the digital information being output from the corresponding second unit to decide whether or not the detected test signal is normal.

13. A digital information receiving system including a first unit for receiving and outputting digital information, and a plurality of second units, which are able to be attached to and detached from the first unit to form a daisy-chain connection via the first unit, for receiving the digital information via the daisy-chain connection, applying peculiar processing to the digital information, and sending back processed digital information to the first unit, the system comprising:
- a plurality of switching means, each provided to a corresponding one of the second units, for switching so as to incorporate the corresponding second unit into the daisy-chain connection or disconnect the corresponding second unit from the daisy-chain connection:
- an abnormality detecting deciding means for detecting and deciding abnormality of the plurality of second units; and
- a controlling means for controlling a switching means corresponding to a second unit which is detected and decided to be abnormal so as to disconnect the second unit from the daisy-chain connection and reset second units succeeding to the second unit, whose abnormality is detected and decided based on a signal from the abnormality detecting deciding means detects and decides the abnormality.

\* \* \* \* \*